United States Patent
Ogawa

(10) Patent No.: US 7,961,257 B2
(45) Date of Patent: Jun. 14, 2011

(54) COLOR ADJUSTING APPARATUS, DISPLAY APPARATUS, PRINTING APPARATUS, IMAGE PROCESSING APPARATUS, COLOR ADJUSTMENT METHOD, GUI DISPLAY METHOD, AND PROGRAM

(75) Inventor: Kaoru Ogawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 1295 days.

(21) Appl. No.: 11/535,120

(22) Filed: Sep. 26, 2006

(65) Prior Publication Data

US 2007/0070468 A1    Mar. 29, 2007

(30) Foreign Application Priority Data

Sep. 28, 2005 (JP) ................. 2005-281686

(51) Int. Cl.
*H04N 9/64* (2006.01)
(52) U.S. Cl. ...................... 348/649; 348/645
(58) Field of Classification Search .......... 348/649–654; 382/167, 166; 345/518
See application file for complete search history.

(56) References Cited

U.S. PATENT DOCUMENTS

| 6,724,935 B1 * | 4/2004 | Sawada et al. | 382/167 |
| 7,599,551 B2 * | 10/2009 | Takahashi et al. | 382/167 |
| 2004/0240729 A1 | 12/2004 | Cooper et al. | |

FOREIGN PATENT DOCUMENTS

| EP | 1 139 653 | 10/2004 |
| JP | 02-096477 | 4/1990 |
| JP | 11-017963 | 1/1999 |
| JP | 2001-293890 | 10/2001 |
| JP | 2001-352459 | 12/2001 |
| JP | 2002-374424 | 12/2002 |
| JP | 2003-1100868 | 4/2003 |
| JP | 2004-064111 | 2/2004 |
| JP | 2004-064198 | 2/2004 |
| JP | 2004-297390 | 10/2004 |

OTHER PUBLICATIONS

European Search Report dated Feb. 14, 2007.
An office action from the Japanese Patent Office for Japanese Patent document 2005-281686 issued Sep. 30, 2008.

* cited by examiner

Primary Examiner — M. Lee
(74) Attorney, Agent, or Firm — SNR Denton US LLP

(57) ABSTRACT

A color adjusting apparatus includes a first storage unit for storing information indicating a hue (color phase) range arbitrarily designated in a hue space, a second storage unit for storing an adjustment value for adjusting a degree of color shift in the hue range, and a color conversion unit for performing expansion processing or compression processing on a color component of input image data, the color component being associated with the hue range, in accordance with the degree of color shift determined by the adjustment value.

7 Claims, 24 Drawing Sheets

FIG. 1

| ORIGINAL IMAGE | | OUTPUT IMAGE |
|---|---|---|
| (1) BLUE | → | VIOLET |
| (2) VIOLET | → | MAGENTA |
| (3) YELLOW-GREEN | → | YELLOW |
| (4) ORANGE | → | YELLOW |
| (5) SKY BLUE | → | DEEP SKY BLUE |

FIG. 17B
FIG. 17C
FIG. 17A
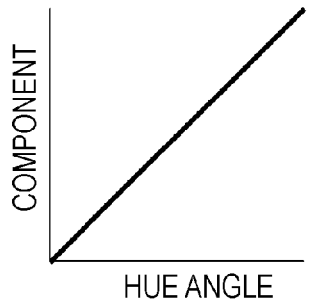
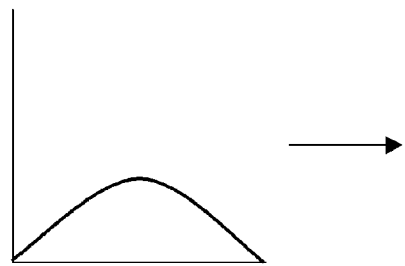 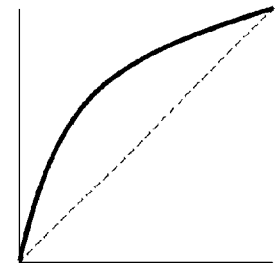
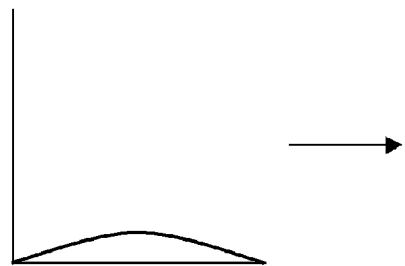 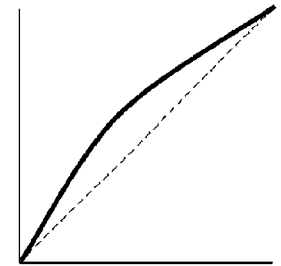
+
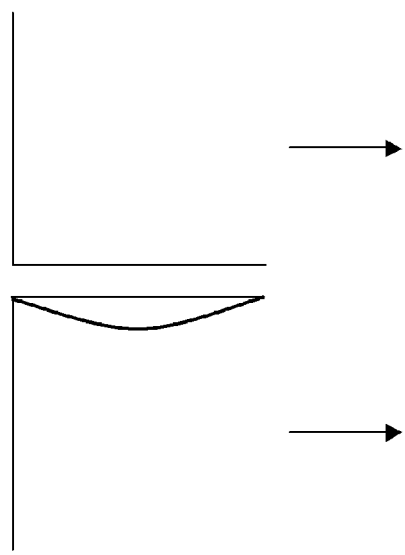 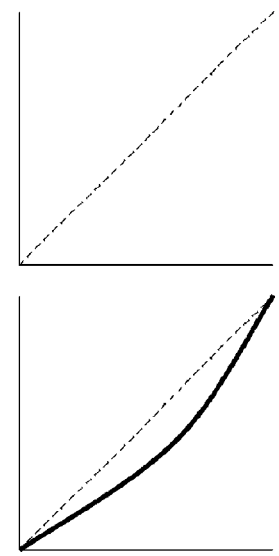
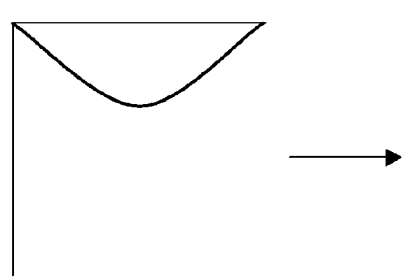 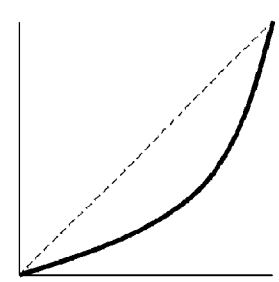

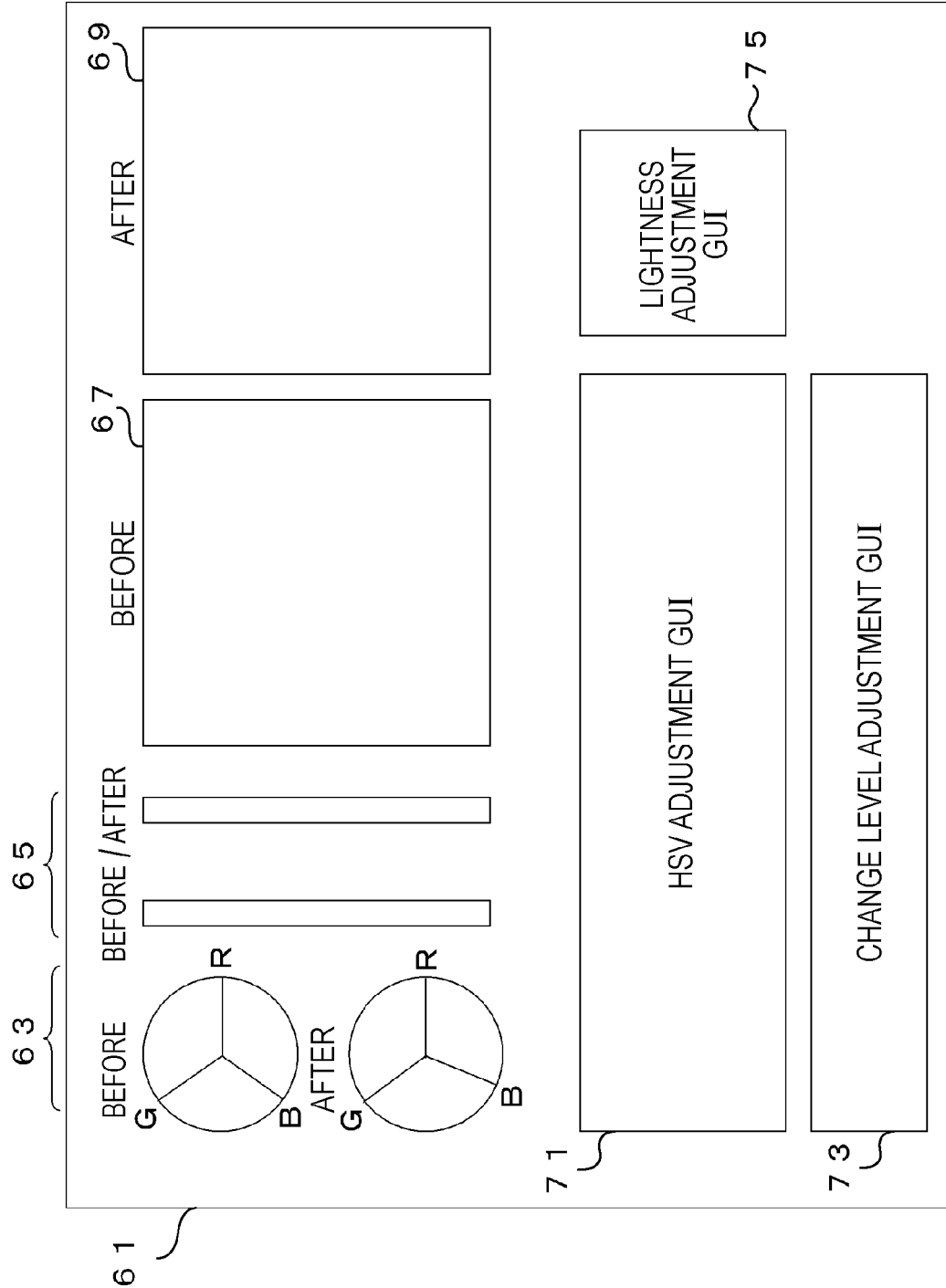

FIG. 24

PARAMETER TABLE

| PARAMETER SET 1 | PARAMETER SET 2 | PARAMETER SET 3 | PARAMETER SET 4 | PARAMETER SET 5 |
|---|---|---|---|---|
| PARAMETER SET 6 | PARAMETER SET 7 | PARAMETER SET 8 | PARAMETER SET 9 | PARAMETER SET 10 |
| PARAMETER SET 11 | PARAMETER SET 12 | PARAMETER SET 13 | PARAMETER SET 14 | PARAMETER SET 15 |
| PARAMETER SET 16 | PARAMETER SET 17 | PARAMETER SET 18 | PARAMETER SET 19 | PARAMETER SET 20 |
| PARAMETER SET 21 | PARAMETER SET 22 | PARAMETER SET 23 | PARAMETER SET 24 | PARAMETER SET 25 |

COLOR ADJUSTING APPARATUS, DISPLAY APPARATUS, PRINTING APPARATUS, IMAGE PROCESSING APPARATUS, COLOR ADJUSTMENT METHOD, GUI DISPLAY METHOD, AND PROGRAM

CROSS REFERENCES TO RELATED APPLICATIONS

The present invention contains subject matter related to Japanese Patent Application JP 2005-281686 filed in the Japanese Patent Office on Sep. 28, 2005, the entire contents of which are incorporated herein by reference.

BACKGROUND OF THE INVENTION

1. Field of the Invention

The present invention relates to color adjustment techniques for output images. In particular, the present invention relates to a color adjusting apparatus, a display apparatus, a printing apparatus, an image processing apparatus, a method for adjusting colors, a method for displaying a graphical user interface (GUI), and a program which implement the color adjustment techniques.

2. Description of the Related Art

In image output, there are situations where colors of original images do not match those of output images. An example of such situations is illustrated in FIG. 1. For example, blue in an original image is seen as violet in an output image, and violet in the original image is seen as magenta in the output image. This color mismatch is caused by coloring characteristics unique to individual output devices.

For this reason, various color adjustment techniques have been developed.

In color adjustment of image data, in general, a red component (R component), a green component (G component), and a blue component (B component) of each pixel are individually adjusted.

However, this adjustment scheme has a disadvantage in that it is difficult for a human to perceive a relationship between the amount of adjustment and the amount of resultant color change. For example, when generating a color close to that of human skin, it is difficult to determine how the balance of the R component, G component, and B component is to be changed or adjusted. In addition, it is not certain in many circumstances whether the change of the color balance will bring about a desired color.

Thus, techniques have been developed in which images in the RGB color space are transformed into the HSV color space, and then the hues of the images are adjusted (see, for example, Japanese Unexamined Patent Application Publication No. 2001-352459 and Japanese Unexamined Patent Application Publication No. 2004-064198). The HSV color space is a color perception space in which a color is defined by three dimensions: hue, saturation, and value or lightness.

SUMMARY OF THE INVENTION

However, when the above techniques are employed, hues of all colors in an image are uniformly changed. Specifically, changing only the hue of a specific color component in the image is not allowed, and a hue change affects all color components in the image. Thus, hue enhancement for a color is likely to result in hue degradation for another color.

The present invention has been made in view of the above circumstances. Accordingly, there is a need for a technique which allows individual adjustment of a specific color component. Thus, a color adjustment technique according to an embodiment of present invention includes, on the basis of information indicating a hue range arbitrarily designated in a hue space, extracting a color component in input image data which is associated with the arbitrarily designated hue range, and performing expansion processing or compression processing on the extracted color component in accordance with a degree of color shift determined by an adjustment value for adjusting the degree of color shift within the hue range.

With a technique according to an embodiment of the present invention, a change of color components within a hue range or a color phase range which is arbitrarily designated can be partially expanded (i.e., color shift in the hue range is delayed) or partially compressed (i.e., color shift in the hue range is advanced), without affecting adjacent hue components. That is, the technique allows for adjustment of a degree of color shift within the designated hue range.

In this technique, a color component range to be adjusted can be designated within the range of human color perception.

BRIEF DESCRIPTION OF THE DRAWINGS

FIG. 1 illustrates an example of a situation in which colors in an original image do not match those in an output image;

FIGS. 17A to 17C illustrate a technique for facilitating obtaining an input/output relation preferred in adjustment of a degree of color shift;

FIG. 18 illustrates an example of a GUI used for color adjustment;

FIG. 24 illustrates an example of a parameter set corresponding to a reduced image constituting a GUI.

DESCRIPTION OF THE PREFERRED EMBODIMENTS

In the following, the preferred embodiments of the present invention will be described with reference to the accompanying drawings.

Note that techniques which have been known or available in the art are used for components which are not shown herein or of which no specific description is provided herein.

In addition, the exemplary embodiments which will be described below are illustrative only and should not be considered restrictive in any way.

A) Implementation of Color Adjustment in HSV Space

As described above, in the color adjustment technique, the degree to which an R component, a G component, and a B component can be individually adjusted is limited due to the limitations of human color perception. In addition, when an image to be adjusted includes a grayscale image, application of the color adjustment to a colored image may produce a color in the grayscale image.

Thus, in a technique according to an embodiment of the present invention, image data in the RGB space (defined by red, green, and blue) is converted into the HSV space (defined by hue, saturation, and value or lightness), and then color adjustment is performed in the HSV space.

Figure 2:
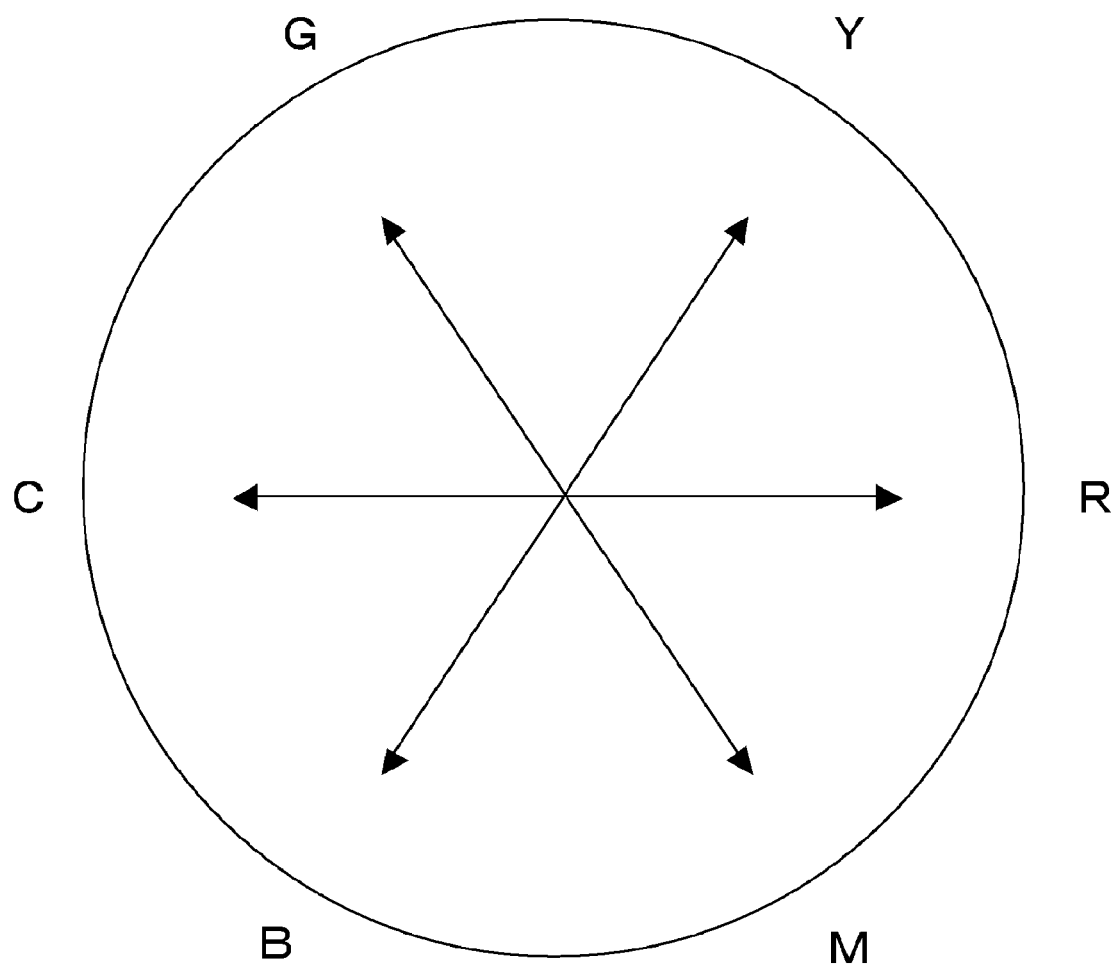
FIG. 2 conceptually illustrates a hue circle.

FIG. 2 shows an example of a hue circle in which only hue components in the HSV space are conceptually illustrated. The figure illustrates a hue relationship between representative colors used in display systems and printing systems: R (red), G (green), B (blue), C (cyan), M (magenta), Y (yellow).

The relationship among the individual hue components is perceived by a viewer through human color perception, and a reproduced color can be adjusted through rotation or shift of hue. For example, when it is desired to increase the intensity of yellow in a region in a reproduced image which is seen as green, the hue is to be rotated clockwise.

However, as mentioned above, such hue rotation uniformly affects other colors. Thus, in a color adjustment technique according to an embodiment of the present invention, the hue of a specific color component can be independently adjusted.

Color adjustment performed in the HSV space does not affect a grayscale image or achromatic region of an image to be color-adjusted. That is, this color adjustment technique does not cause deterioration of a color balance in the image and thus production of a color in the grayscale image.

In view of the above, the color adjustment technique in this embodiment employs a scheme in which color adjustment is performed in the HSV space.

B) System Example

B-1. Printing Apparatus

Figure 3:
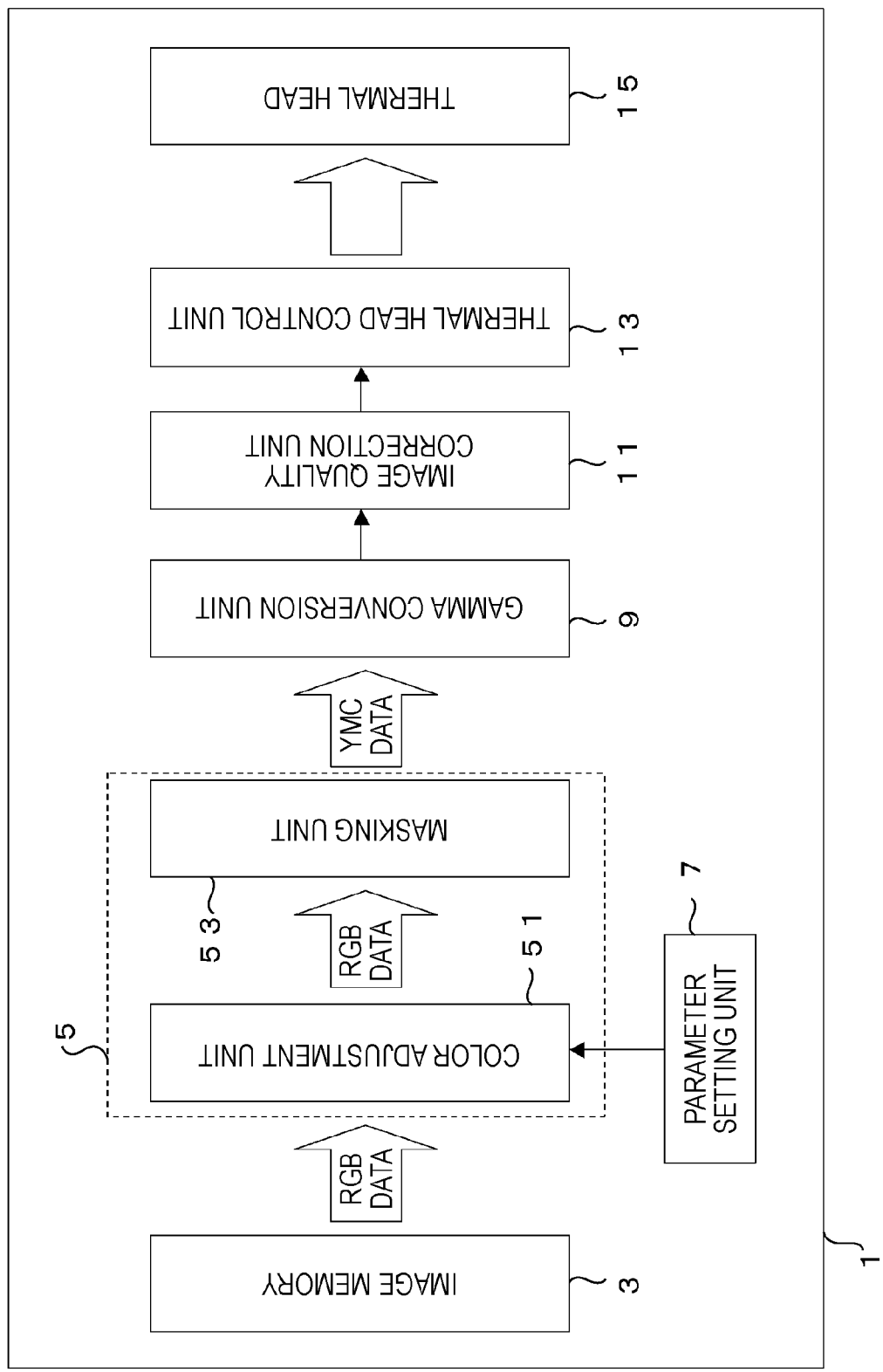
FIG. 3 is a block diagram illustrating a configuration of a printing apparatus provided with color adjustment unit for executing color adjustment processing in the HSV space.

FIG. 3 illustrates a printing apparatus 1 according to an embodiment of the present invention. The printing apparatus 1 includes an image memory 3, a digital signal processor 5, a parameter setting unit 7, a gamma conversion unit 9, an image correction unit 9, an image correction unit 11, a thermal head control unit 13, and a thermal head 15.

It can be seen from the above that the printing apparatus 1 is a thermal printer in this embodiment. However, the printing apparatus 1 is not limited to being a thermal printer and may be an inkjet printer or a laser printer. The printing apparatus 1 is also provided with a system control unit although it is not shown in the figure.

The image memory 3 is a storage unit for temporarily storing image data which has been input for printing. In this embodiment, a semiconductor memory is applied. However, another storage unit such as a hard disk or a magnetic memory unit can also be used as the image memory 3. In this embodiment, a case is assumed where image data is input as RGB data.

The digital signal processor 5 performs color adjustment and conversion of RGB data into YMC (yellow, magenta, cyan) data through arithmetic processing. For example, a microprocessor can be implemented as the digital signal processor 5.

The digital signal processor 5 includes a color adjustment unit 51 and a masking unit 53.

The color adjustment unit 51 performs arithmetic processing for executing color adjustment in the HSV space. The processing performed in the color adjustment unit 51 includes processing for converting RGB data into HSV, color adjustment processing on the converted HSV data, and processing for converting the color-adjusted HSV data into RGB data.

The masking unit 53 performs operation processing for converting RGB data into YMC data, which is suitable for printing.

Such a color adjustment scheme, in which color adjustment is executed through arithmetic processing of the digital signal processor 5, permits high processing precision. Sufficient processing speed of the processor (microprocessor in this case) is desired.

The parameter setting unit 7 sets parameters for color adjustment executed in the HSV space.

The parameters include hue, saturation, value or lightness, and a degree of color shift within a designated hue range. These parameters are specified through a graphical user interface (GUI) which will be described below.

The gamma conversion unit 9 performs input-output conversion for converting gradation in an image reproduced through an output device so that the gradation appears to be linear in an output image. In this case, the gamma conversion unit 9 executes such conversion processing so that gamma characteristics dependent on a thermal head are corrected.

The image correction unit 11 executes known correction processing for enhancing image quality, such as edge correction and sharpness correction.

The thermal head control unit 13 executes a control operation necessary for driving the thermal head 15 such as supplying current to a heating element.

The thermal head 15 is a device in which heating elements are arranged along a direction of print span. An ink film to which a sublimation material is attached is used for printing of a color image.

B-2. Printing Apparatus

In the printing apparatus illustrated in FIG. 3, color adjustment processing is executed through arithmetic processing. However, data processing similar to that performed by the above printing apparatus can also be realized using a lookup table.

Figure 4:
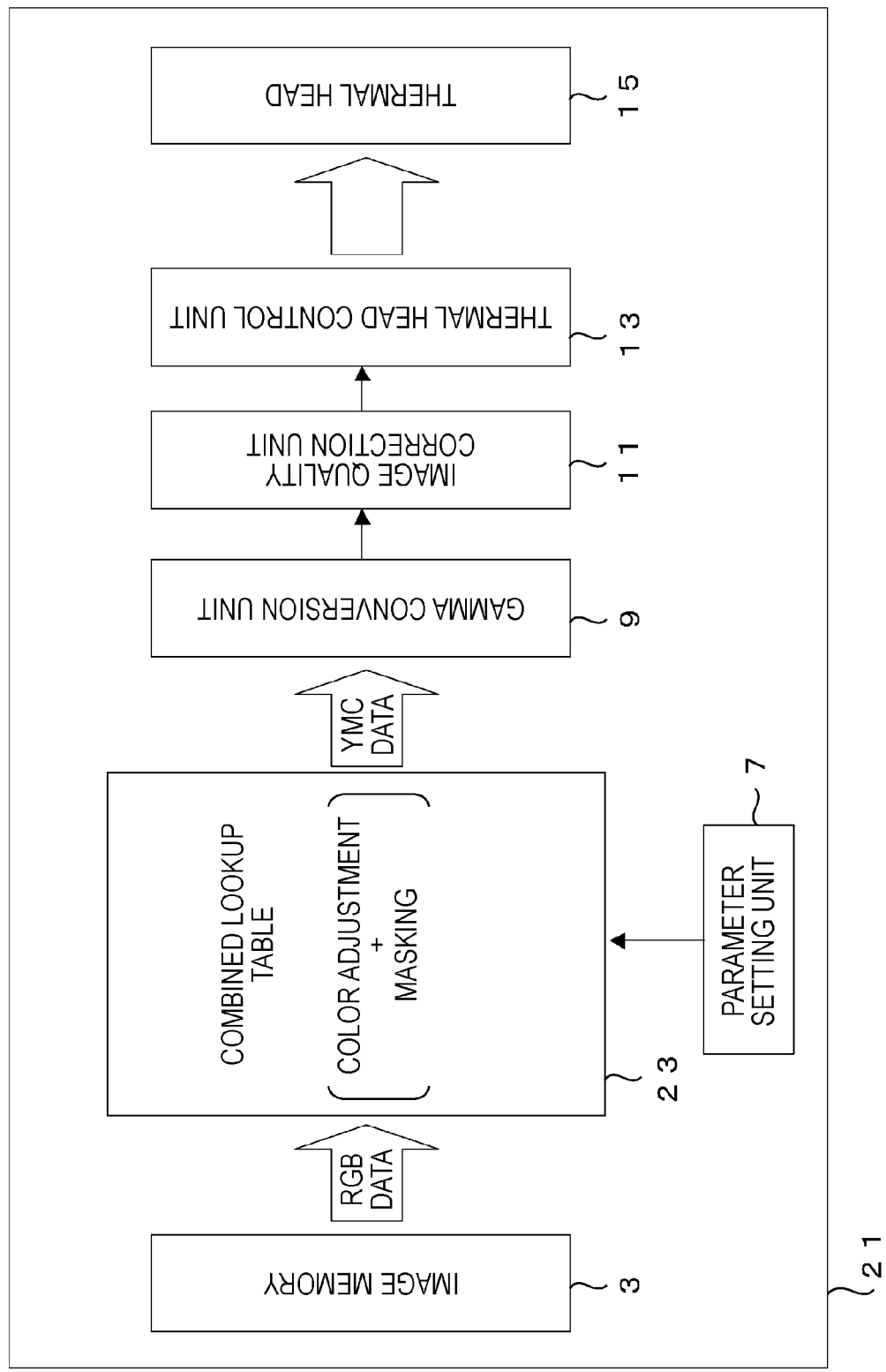
FIG. 4 is a block diagram illustrating a configuration of a printing apparatus employing a lookup table.

FIG. 4 illustrates an example of a configuration of a printing apparatus 21 which uses such a lookup table. In the figure, parts similar to those shown in FIG. 3 are designated by the same reference numerals.

The printing apparatus 21 includes the image memory 3, a combined lookup table 23, the parameter setting unit 7, the gamma conversion unit 9, the image correction unit 11, the thermal head control unit 13, and the thermal head 15.

The combined lookup table 23 has registered therein an input/output relation in which color adjustment processing and masking processing are combined.

A lookup table is generally composed of a storage device such as a ROM (Read-Only Memory) and a RAM (Random Access Memory). An advantage of using lookup tables is high processing speed and low cost. However, to implement a lookup table, a manufacturing process in which an input/output relation is calculated in advance for creating the lookup table is necessary. The combined lookup table 23 in this embodiment serves to convert RGB data into YMC data.

B-3. Display Apparatus

In the above example, the case is illustrated where a color adjustment unit is mounted in a printing apparatus. However, the color adjustment unit can also be implemented in a display apparatus.

Figure 5:
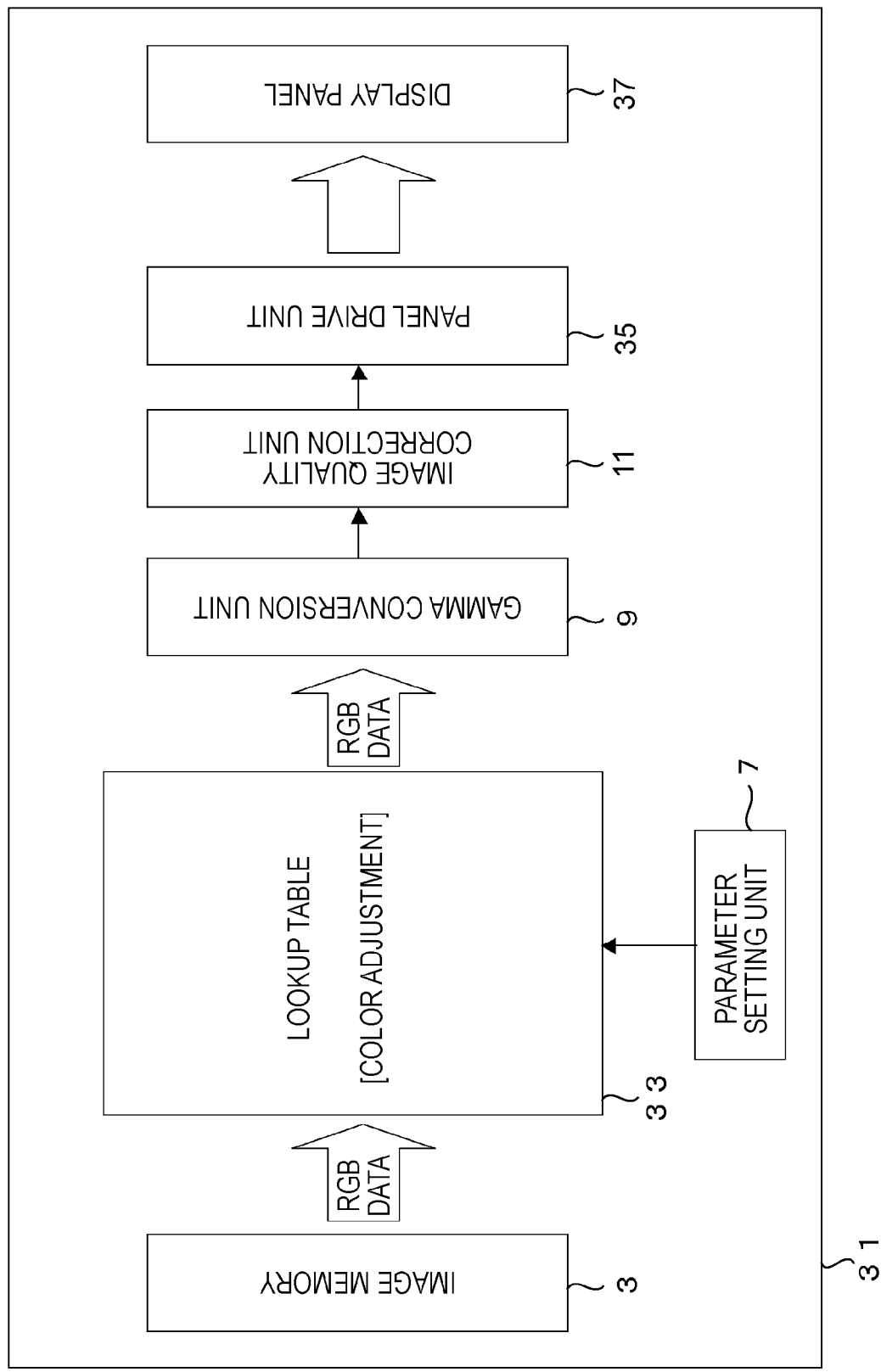
FIG. 5 is a block diagram illustrating a configuration of a display apparatus employing a lookup table.

Referring to FIG. 5, an example of a configuration of a display apparatus 31 which serves as an output apparatus. In the figure, parts similar to those shown in FIG. 3 are designated by the same reference numerals.

The display apparatus 31 includes the image memory 3, a lookup table 33, the parameter setting unit 7, the gamma conversion unit 9, the image correction unit 11, a panel drive unit 35, and a display panel 37. In this embodiment, the display apparatus 31 employs a flat panel as a display device. Thus, when a CRT monitor is employed as the display device, a CRT drive unit is to be implemented instead of the panel drive unit 35.

In the lookup table 33, only an input/output relation associated with color adjustment processing is registered. This is because RGB data is used in a later-stage unit, and thus input RGB data does not need to be converted into YMC data in the lookup table 33. Needless to say, the input/output relation has been calculated in advance and registered in the lookup table 33.

The panel drive unit 35 executes a control operation necessary for driving the display panel 37, such as horizontal scanning drive and vertical scanning drive.

The display panel 37 may be a liquid crystal panel, a plasma display panel, a FED (Field Emission Display) panel, or another type of flat panel display. In addition, the display panel 37 may be a direct viewing type or a projection type.

C) Elements of Color Adjustment

In the following, elements of color adjustment performed in the HSV space will be described in detail.

The color adjustment is carried out using any one of or a combination of parameters: hue, saturation, value or lightness, and degree of color shift.

C-1. Hue

As described above, the hue adjustment technique in which all colors in a hue circle are uniformly rotated or shifted has been employed in known analog television receivers. However, as described above, this technique is likely to produce an unexpected hue adjustment result. For example, hue adjustment may result in an undesirable change of a color which has been reproduced appropriately and is not intended to be adjusted.

There are cases where colors other than a color to be adjusted (target color) are appropriately reproduced and do not need to be adjusted.

Thus, a technique according to an embodiment of the present invention allows individual color adjustment to be performed only on a target color. Specifically, as shown in FIGS. 6A to 6B, six hue axes R, G, B, C, M, and Y are defined, and the hues of the six color components are individually adjusted.

Figure 6A:
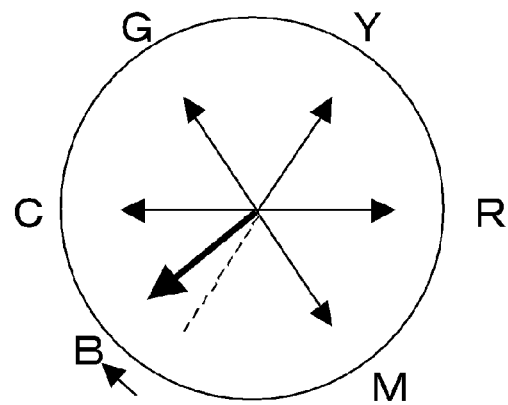
FIGS. 6A to 6C illustrate a scheme for adjusting hue independently for each of six hue axes.
Figure 6B:
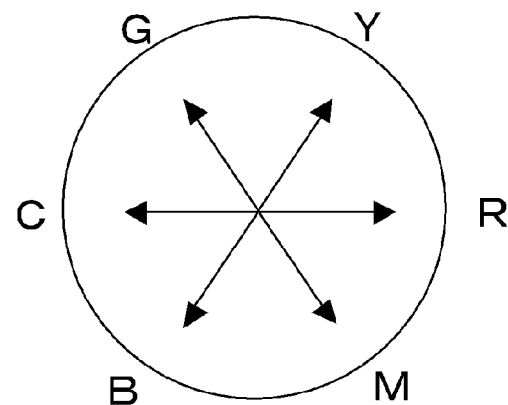

FIG. 6B illustrates a state in which no hue adjustment is performed.

FIG. 6A illustrates a case where hue is adjusted by shifting the axis B towards the axis C.

In this case, a color shift pattern for colors between the axis B and the axis C and a color shift pattern for colors between the axis B and the axis M are changed. However, the other colors (i.e., colors between the axis C and the axis M) are not affected by the hue adjustment. Specifically, a color reproduction range for a color between the axis C and the axis B decreases, and a color reproduction range for a color between the axis B and the axis M increases.

Figure 6C:
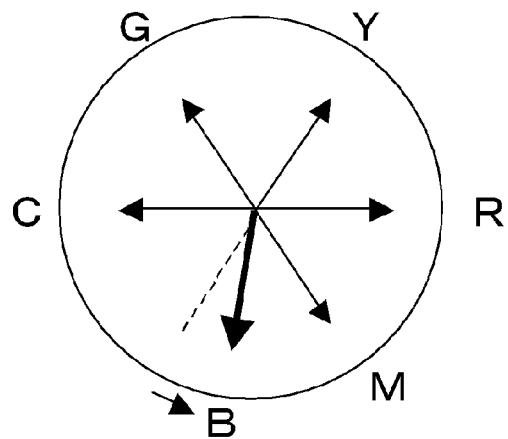

FIG. 6C illustrates a case in which hue is adjusted by shifting the axis B towards the axis M. Also in this case, a color shift pattern for a color between the axis B and the axis C and a color shift pattern for a color between the axis B and the axis M are changed. However, the other colors (i.e., colors between the axis C to the axis M) are not affected by the hue adjustment. Specifically, a color reproduction range for a color between the axis C and the axis B increases, and a color reproduction range for a color between the axis B and the axis M decreases.

Thus, this technique permits adjustment of a specific color component.

Note that the phase axes defined in the above example are not limited to the above six colors, and other hue axes of arbitrary color components such as an axis of orange and an axis of violet can be defined. By defining a hue axis for an arbitrary color (target color), the hue of the target color and the hue of another color can be separately adjusted.

In addition, hue is an angular coordinate. Thus, when the color components of R, G, B, C, M, and Y are selected, the hue axes to be defined are arranged at 60 degree intervals, as illustrated in FIGS. 6A to 6C.

Figure 7:
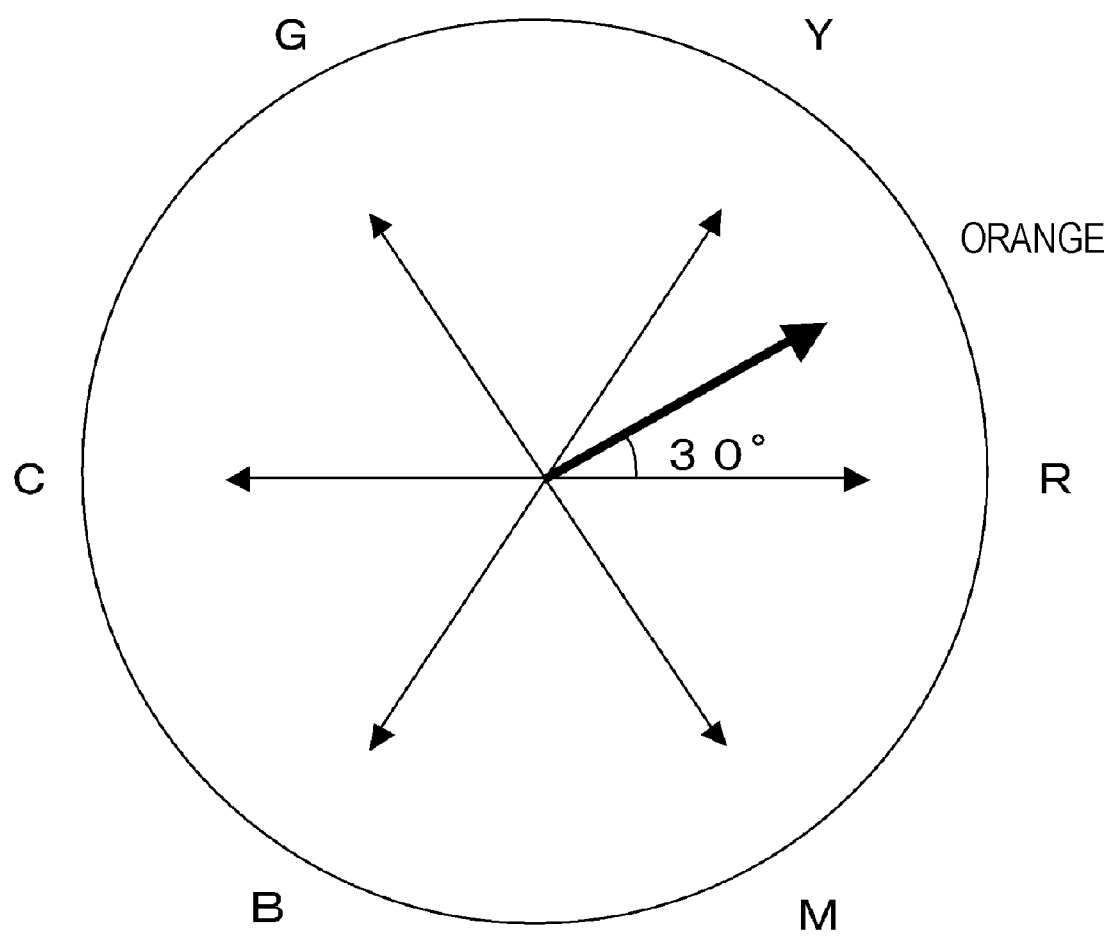
FIG. 7 illustrates a relationship between hues when a hue axis of orange color is added to a hue circle.

Accordingly, when a hue axis of orange is newly defined, the orange axis can be arranged at approximately 30 degrees from the red axis. FIG. 7 illustrates a state in which the orange axis is set for color adjustment. By setting the hue axis for orange color, the range of colors to be affected by the color adjustment can further be limited. For example, when hue axes used for hue adjustment are provided at 60 degree intervals, the range to be affected by the color adjustment is 120 degrees. On the other hand, when the hue axis for an orange component is added, the range to be affected can be limited to 60 degrees that is an angle between the Y axis and the R axis.

In addition, the range to be affected by the adjustment for the Y axis and the M axis can be limited to 90 degrees between the Y axis and the orange axis and between the orange axis to the M axis, respectively.

Thus, by arbitrarily adding a hue axis, a color range to be affected by color adjustment can be limited to specific color components. This brings about stronger adjustment effect than the known techniques described above.

Needless to say, hue adjustment can be performed for not only one hue axis but a plurality of hue axes at the same time. In addition, an adjustment direction can be set for each hue axis. Further, an arbitrary combination of hue axes can be set.

C-2. Saturation

Techniques have been employed in which saturation of all colors is uniformly adjusted. Thus, with such a known technique, even when it is desired to increase or decrease of the intensity of a specific color, the intensity of all colors is uniformly increased or decreased.

Thus, a technique according to an embodiment of the present invention permits adjusting only the saturation of a target color independently, similarly to the case of the hue adjustment described above.

Figure 8A:
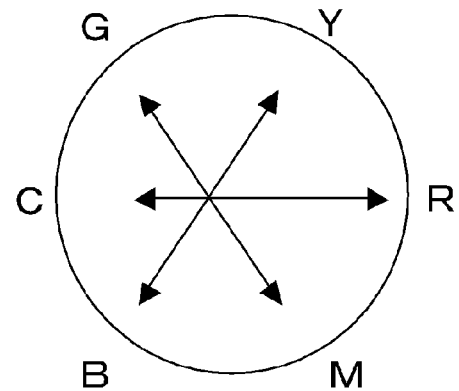
FIGS. 8A to 8C illustrate a scheme in which saturation is adjusted independently for each of six hue axes.
Figure 8B:
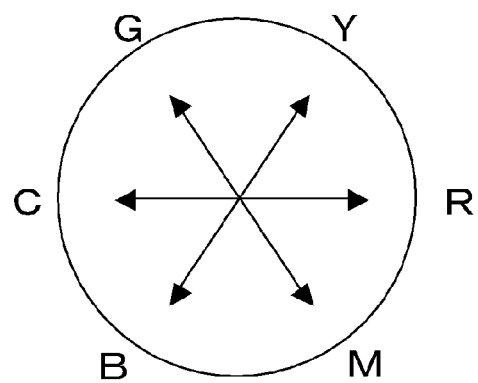
Figure 8C:
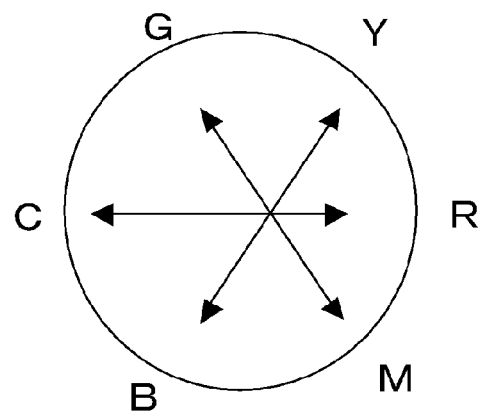

Referring to FIGS. 8A to 8C, an example of saturation adjustment for each color component is illustrated. FIG. 8B illustrates a state where saturation has not been adjusted.

FIG. 8A illustrates saturation adjustment to be performed when it is desired to decrease the vividness of C while increasing the vividness of R. In such a case, the saturation of G, Y, B, and M is not significantly affected. With this arrangement, color adjustment which better reflects user's intention can be realized.

FIG. 8C illustrates saturation adjustment to be performed when it is desired to decrease the vividness of R while increasing the vividness of C. Also in this case, the saturation of G, Y, B, and M is not significantly affected, and color adjustment which better reflects user's intention can be realized.

Note that a color range which is affected by saturation adjustment can be limited by arbitrarily adding a hue axis or setting an arbitrary combination of hue axes, as in the case in the hue adjustment described above.

C-3. Value

In techniques which have been employed for adjusting value or lightness, the values of all colors are uniformly adjusted, and it has not been possible to lighten or darken only a specific color.

Thus, a technique according to an embodiment of the present invention permits adjusting only the saturation of a target color, similarly to the above-described techniques for adjusting hue and saturation. In this embodiment, only a value component of a chromatic region of an image is increased or decreased without increasing or decreasing a value component of a grayscale or achromatic region of the image.

Figure 9A:
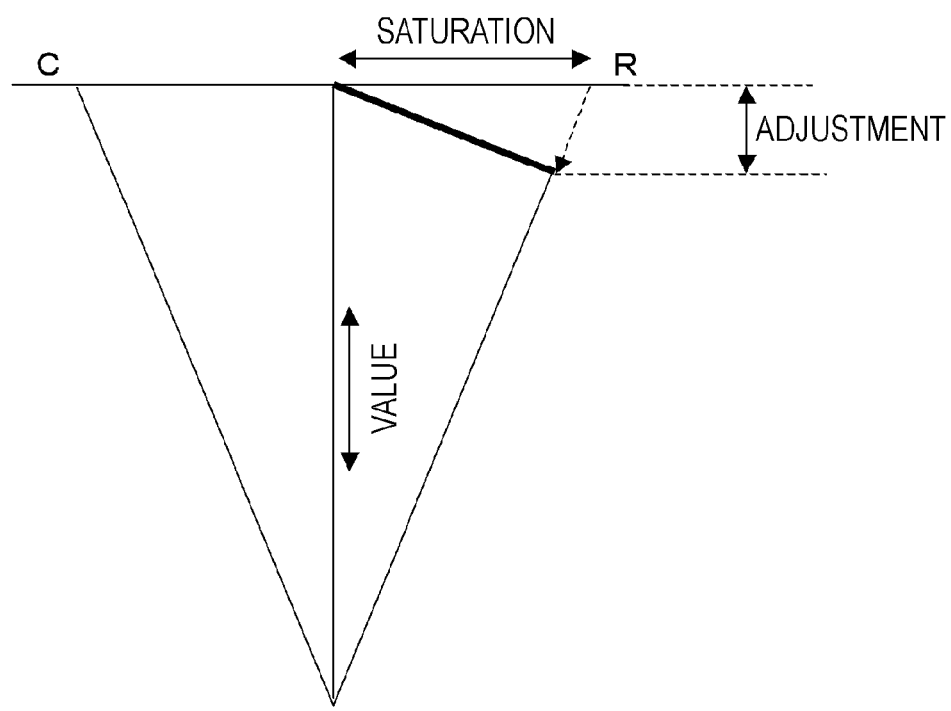
FIGS. 9A and 9B illustrate a scheme in which value is decreased independently for each of six hue axes.
Figure 9B:
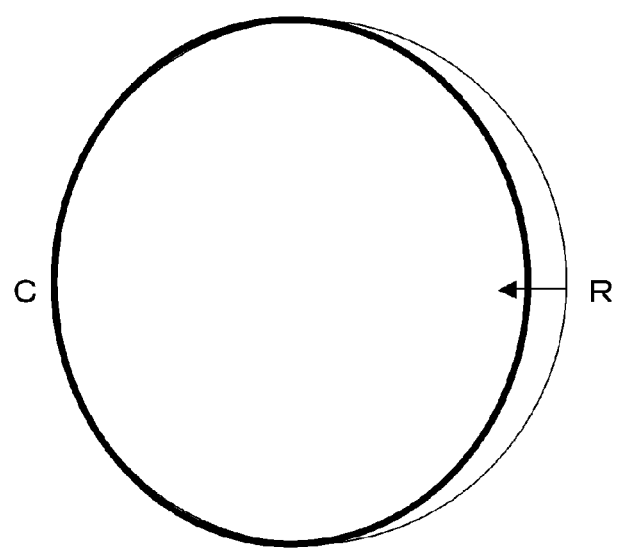

Referring to FIG. 9A, a case is described where the value of a red color is independently decreased. As shown in the figure, the value of an achromatic color (grayscale region in an image) represented by the center of a hue circle is not changed, and only the value of R is decreased. It can be seen that the saturation of the red color is decreased (i.e., red becomes less pure) in conjunction with the value adjustment. In FIG. 9B, a state before the value adjustment is illustrated by a thin line and a state after the value adjustment is illustrated by a thick line.

Figure 10A:
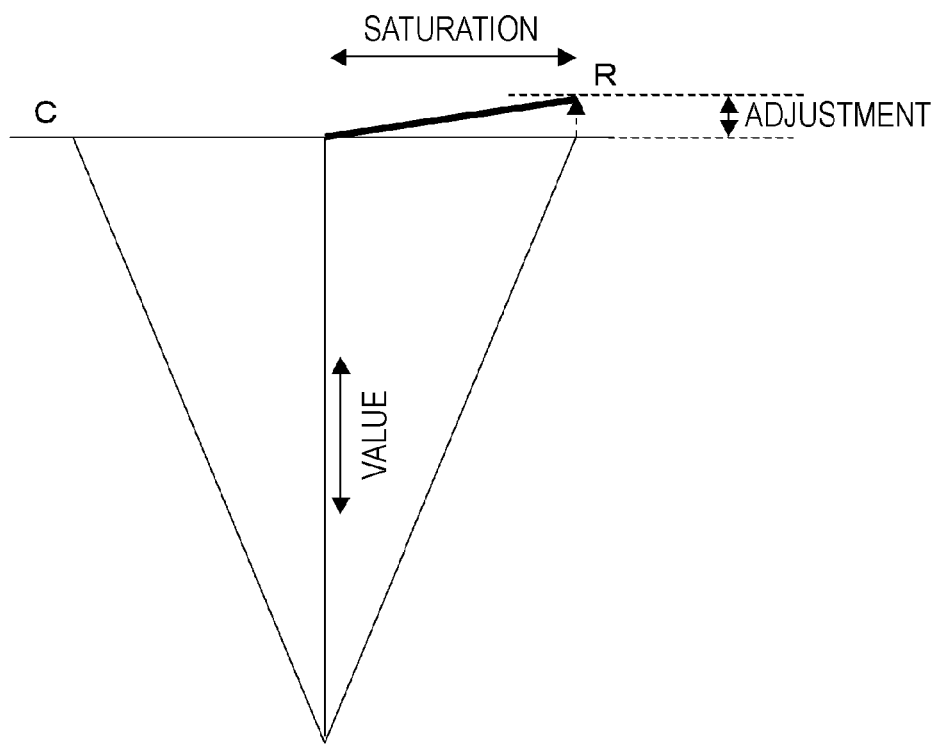
FIGS. 10A and 10B illustrate a scheme in which value is increased independently for each of six hue axes.

It is also possible to increase only the value of the red color. An example of such value adjustment is illustrated in FIG. 10A. A shown in the figure, the value of R is increased while the value of an achromatic color (grayscale portion in an image) represented by the center of a hue circle remains fixed.

Figure 10B:
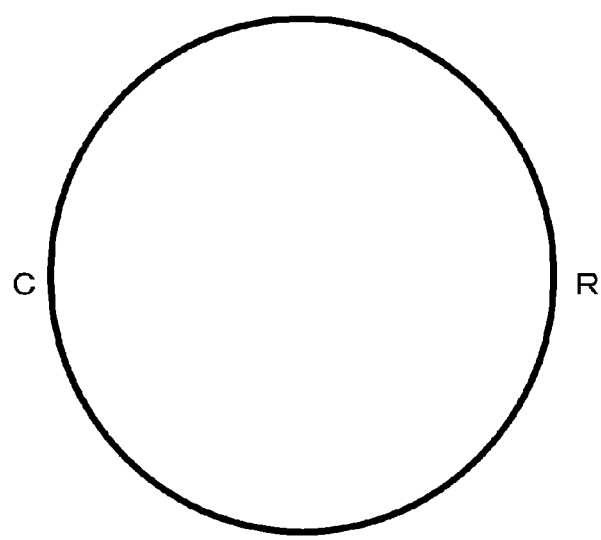
Figure 11:
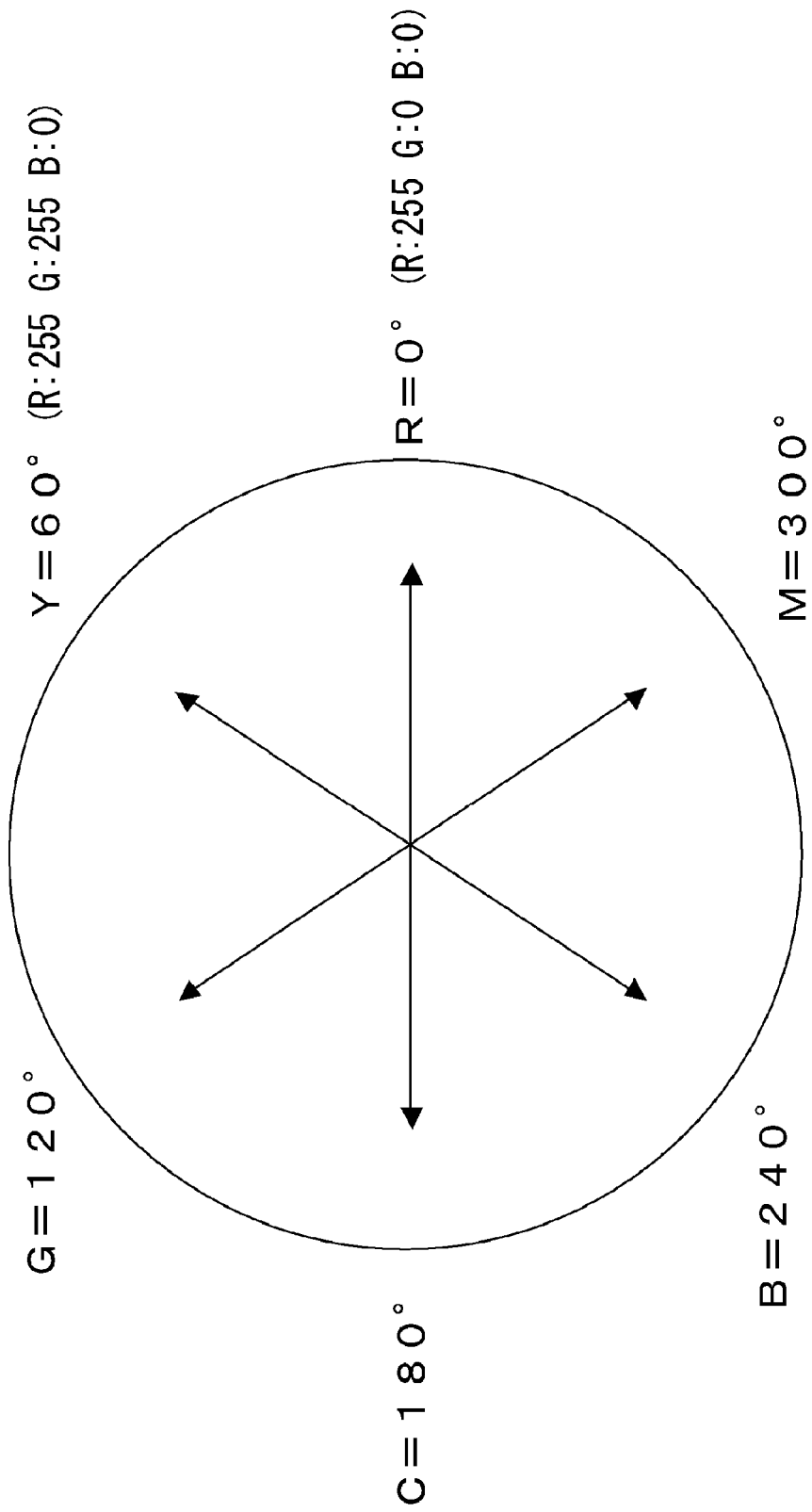
FIG. 11 illustrates a relationship between six hues axes.

However, this value change does not result in a change of the saturation of R. That is, the saturation remains the same after the value adjustment, as illustrated in FIG. 10B.

Needless to say, a color range which is affected by the value adjustment can be limited to a specific hue range by arbitrarily adding a hue axis or setting an arbitrary combination of hue axes, as in the case in the hue adjustment and saturation adjustment described above.

C-4. Degree of Color Shift

In color adjustment, there are colors which cannot be adjusted using only the parameters of hue, saturation, and value. For example, there are circumstances in printing of a medical image where image that is displayed as blue on a screen display appears blue in a printed-out image. This phenomenon occurs since color shift from blue to magenta occurs fast. That is, a degree of color shift within a hue circle does not correspond to human perception.

Thus, a technique according to an embodiment of the present invention attempts to adjust a degree of color shift between adjacent color components among red (R), green (G), blue (B), cyan (C), magenta (M), and yellow (Y), in a hue circle.

Figure 12A:
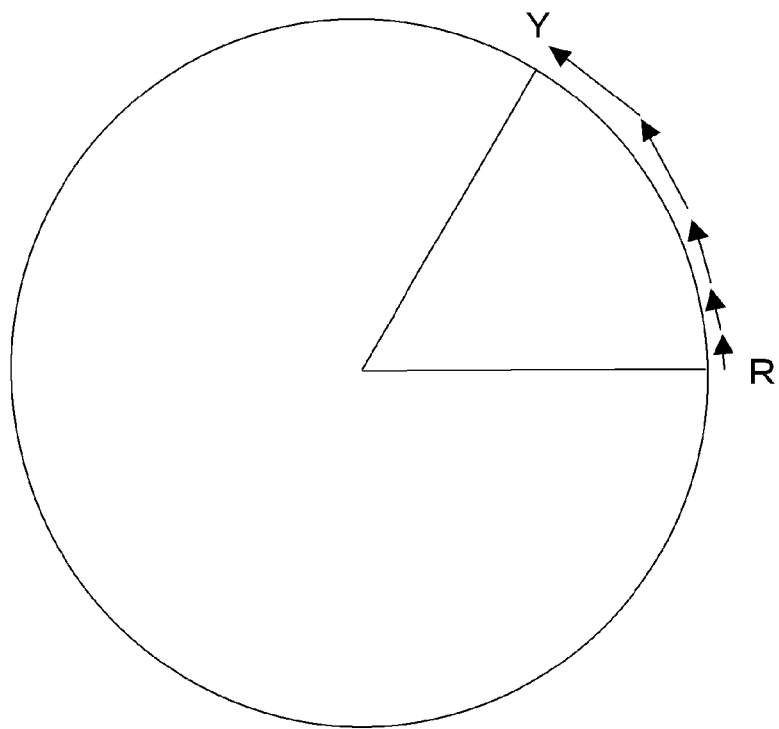
FIGS. 12A and 12B illustrate adjustment a principle of adjustment of a degree of color shift defined between adjacent hue axes.
Figure 12B:
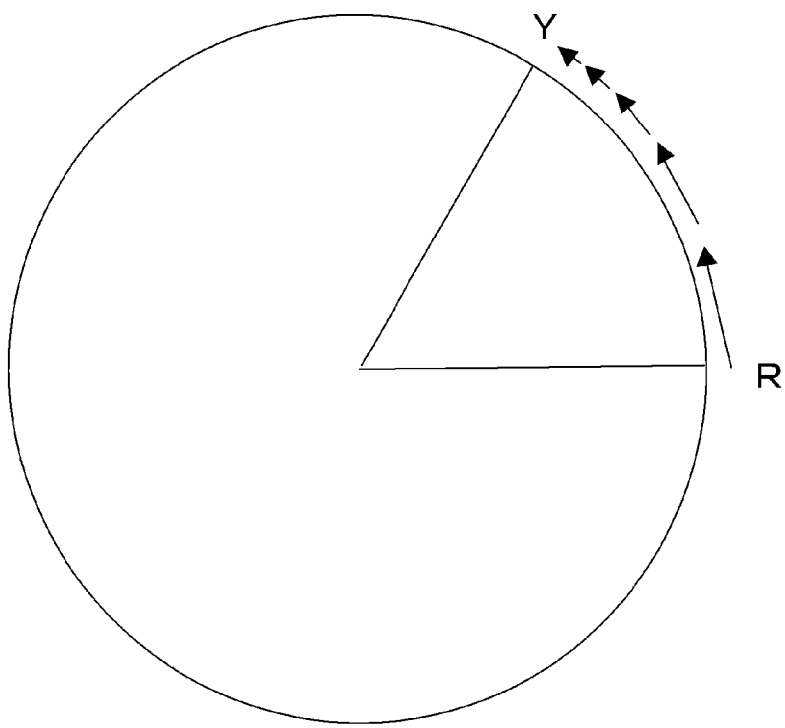

In color shift from R to Y, for example, control of the degree color shift is based on whether shift from R to Y is slow, as illustrated in FIG. 12A and whether R is rapidly shifted to R, as illustrated in FIG. 12B.

The length of arrows shown in FIGS. 12A and 12B indicates the speed of color shift. The longer the arrow is, the faster the shift is. The shorter the arrow is, the slower the shift is.

Needless to say, when six hue axes are defined as in the case of the above, combinations of adjacent hue components include Y and G, G and C, C and B, B and M, M and R, as well as R and Y described above. Thus, these axes create six sections which serve as hue ranges.

Note that the hue axes providing the hue ranges are not limited to corresponding to the above six colors. It is possible to create another section by adjacent color components by adding an arbitrary hue axis.

In the following, adjustment of the degree of color shift is described.

In this embodiment, adjustment of the degree of color shift from R to Y is described as an exemplary case. When color data is represented with eight bits, shift from R to Y is represented as color phase angle shift or hue angle shift from 0 degree to 60 degrees.

In this case, the value of RGB data changes from R=(R: 255, G:0, B:0) to Y (R:255, G:255, B:0).

Figure 13A:
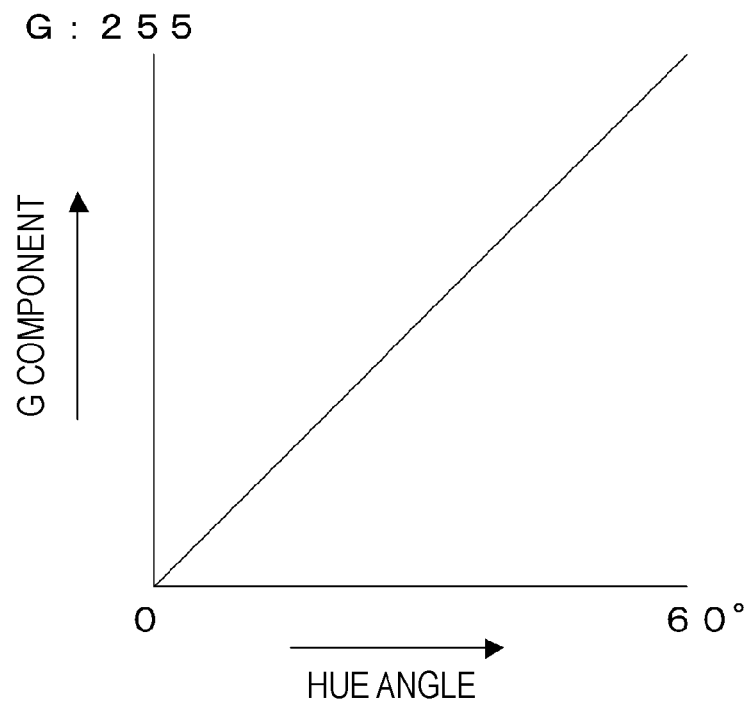
FIGS. 13A and 13B illustrate a scheme for delaying color shift.
Figure 14A:
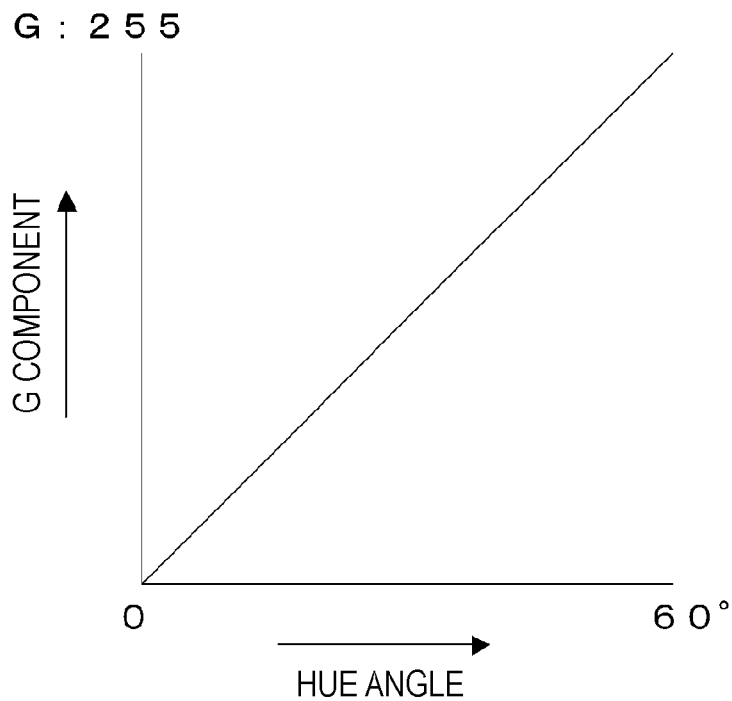
FIGS. 14A and 14B illustrate a scheme for advancing color shift.

FIGS. 13A and 14A illustrates a change in a color component in a case where the degree of color shift is not adjusted. As shown in the figures, only the value of the G component linearly changes from 0 to 255.

Thus, in a technique according to an embodiment of the present invention, the relationship between color components and the color phase or hue angle can be nonlinearly adjusted so that the degree of color shift is controlled.

Figure 13B:
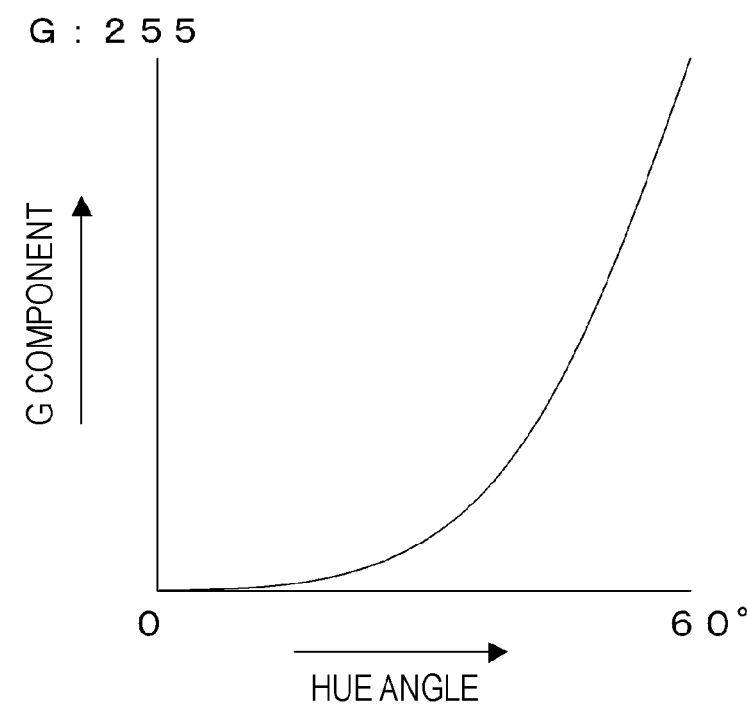

For example, as illustrated in FIG. 13B, the rate of increase of the G component for the color phase between 0 degree to 30 degrees is decreased, while the rate of increase of the G component for the color phase between 30 degrees to 60 degrees is increased. With this arrangement, the degree of color shift from R to Y can be reduced, i.e., the color shift from R to Y can be delayed.

Figure 14B:
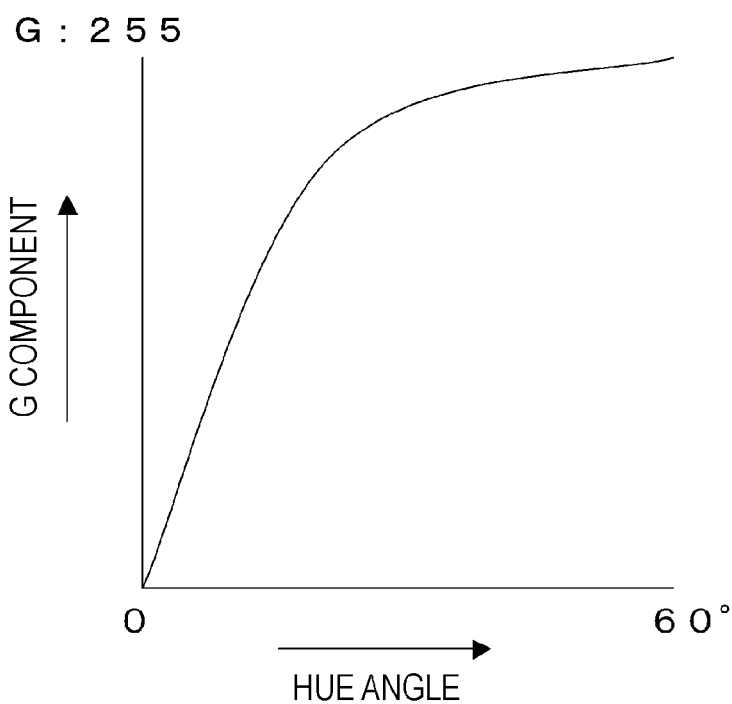

On the other hand, as illustrated in FIG. 14B, the rate of increase of the G component for the color phase between 0 degree to 30 degrees is increased, while the rate of increase of the G component for the color phase between 30 degrees to 60 degrees is decreased. With this arrangement, the degree of color shift from R to Y can be increased, i.e., the color shift from R to Y can be advanced.

When the adjustment of the degree of color shift is desired to be combined with the adjustment of hue, saturation, and/or value, there may be a case where hue has already been changed through hue adjustment or the like.

In this case, the color phases of the R component and the Y component after the hue change is assumed to be $\alpha$ degrees and $\beta$ degrees, respectively. Then, adjustment processing is performed assuming that only the value of the G component is linearly changed from 0 to 255 in accordance with the phase shift from $\alpha$ degrees to $\beta$ degrees.

Also in this case, a color range which is to be affected by the adjustment of the degree of color shift can be limited to a specific hue range by arbitrarily adding a hue axis and setting an arbitrary combination of the hue axes.

Figure 15A:
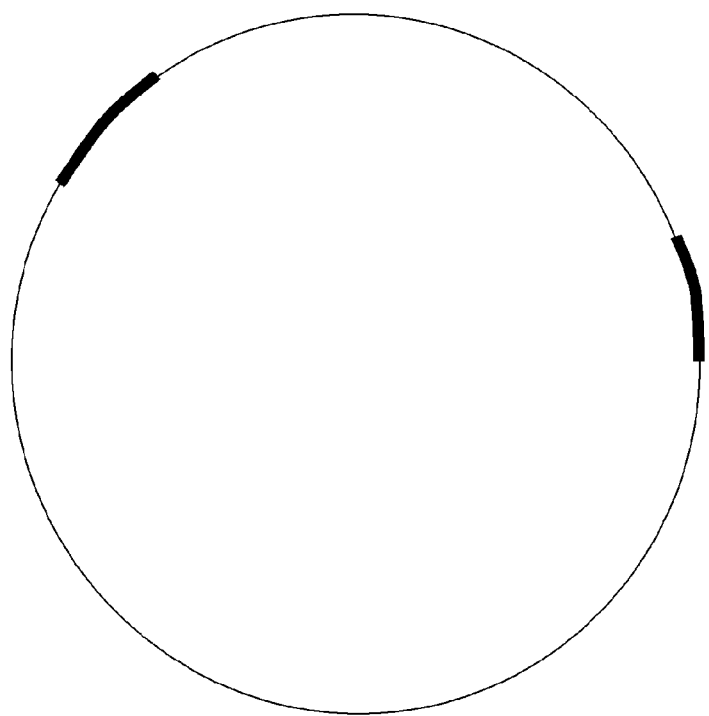
FIGS. 15A and 15B illustrate an example of a hue range for which a degree of color change is independently adjusted.
Figure 15B:
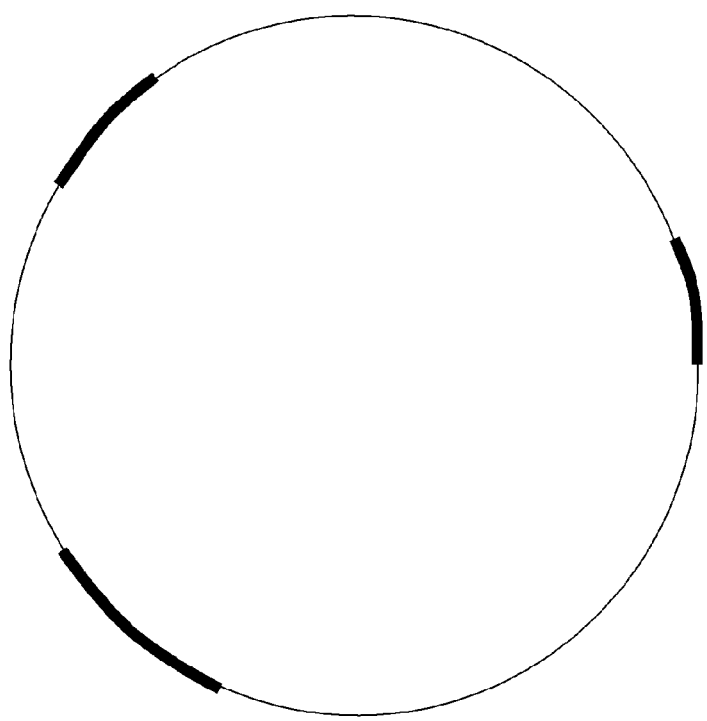

Further, as shown in FIGS. 15A and 15B, a plurality of hue axes (hue ranges) are designated at the same time, and the degree of color shift can be adjusted for each axis.

FIG. 15A illustrates a case in which the degree of color shift is adjusted for two hue ranges in a hue circle, and FIG. 15B illustrates a case in which the degree of color shift is adjusted for three hue ranges in a hue circle.

Figure 16:
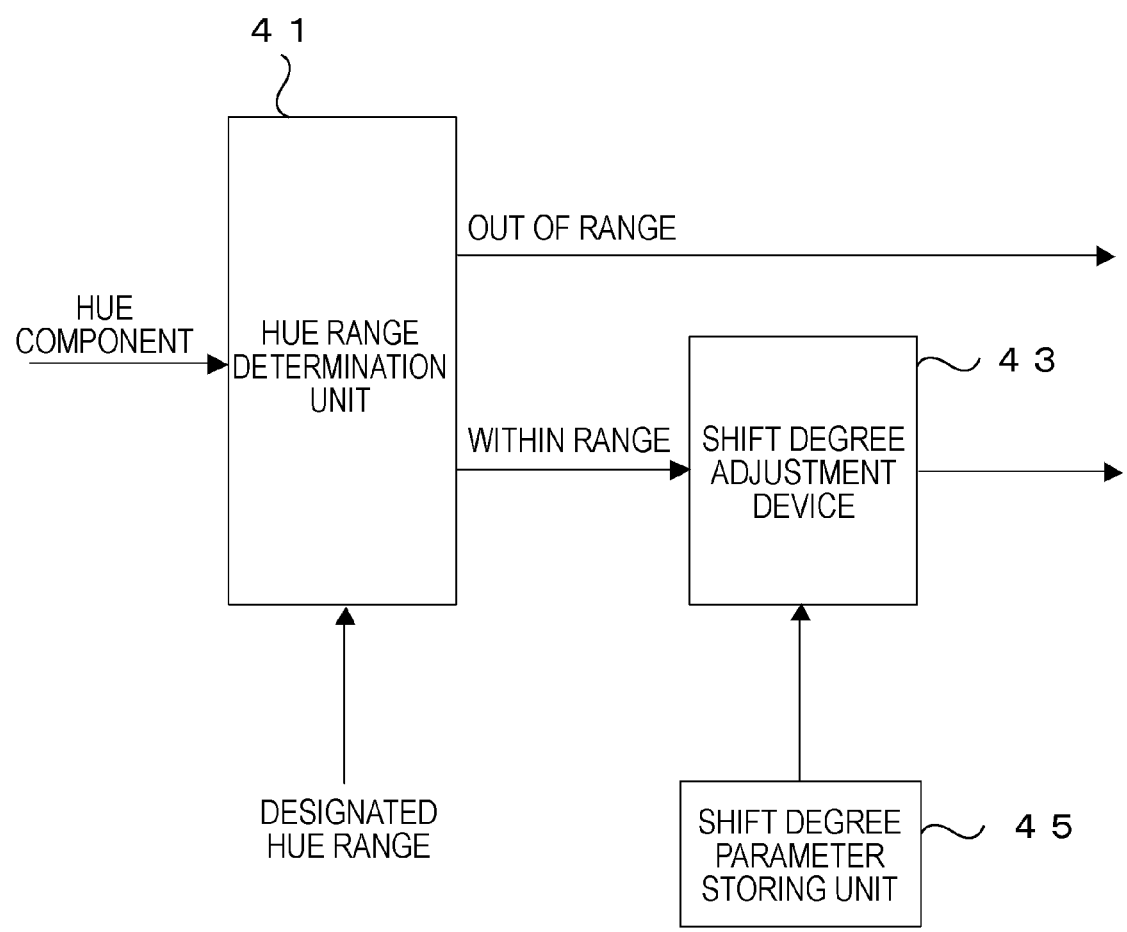
FIG. 16 is a block diagram illustrating a system configuration employed in color adjustment processing.

In order to actually adjust the degree of color shift, a system configuration as illustrated in FIG. 16 and an operation procedure can be employed.

First, a hue range determination unit 41 determines whether or not a color component in input image data is included in a hue range designated by a user. If it is determined that the color component in the input image data is not included in the designated hue range, the degree of color shit is not adjusted, and the operation procedure proceed to processing at a later stage.

On the other hand, if it is determined that the color component in the input image data is included in the designated hue range, the hue range determination unit 41 provides the input color component to a shift degree adjustment unit 43 so that the degree of color shift is adjusted. At this time, parameters indicating the degree of color shift are provided by a shift degree parameter storing unit 45. Setting of the parameters in the shift degree parameter storing unit 45 is executed using a GUI which will be described below.

For an input/output relation applied in the adjustment of the degree of color shift, the nonlinear (quadratic) curve shown in FIG. 13B or FIG. 14B may be used as a function. However, implementation of a calculation scheme or a lookup table, which is described below, facilitates processing.

FIGS. 17A to 17C illustrate a scheme which facilitates obtaining an input/output relation desirable for the adjustment of the degree of color shift.

FIG. 17A illustrates an input/output relation before the adjustment of the degree of color shift. As can be seen from the figure, the color component and the hue have a linear relationship.

FIG. 17B shows sine curves prepared for adjusting the degree of color shift. Out of the five since waves shown in the figure, the sine curve shown at the top of the figure has the largest positive amplitude, providing the maximum effect for advancing color shift.

In contrast, the sine curve shown at the bottom has the largest negative amplitudes, providing the maximum effect for delaying color shift.

Thus, color adjustment in accordance with user's intention can be realized by increasing or decreasing the positive or negative amplitude of the since curve.

FIG. 17C illustrates an input/output relation obtained when the line shown in FIG. 17A and curves shown in FIG. 17B are combined.

D) Example of GUI for Color Adjustment

D-1. Example of Adjustment Screen 1

FIG. 18 illustrates an example of GUI screen display which is suitable for individually adjusting the four elements described above (i.e., hue, saturation, value, degree of color shift).

The GUI is implemented as a function of the parameter setting unit 7.

An adjustment screen 61 has display fields 63, 65, 67, and 69 which are used for comparing color distribution obtained before and after color adjustment, and display fields for GUIs 71, 73, and 75 which are used for specifying elements of color adjustment.

Hue circles for demonstrating color states corresponding to before and after adjustment are displayed on the display field 63. The colors in the above hue circles are represented in the form of vertical bars. The vertical bars are displayed on the display field 65. These display fields are used by a user to simply check a hue change applied to the color distribution regardless of an actual image intended to be color-adjusted.

The actual image on which color adjustment is to be executed is displayed (non-adjusted image) on the display field 67 and an adjusted image is displayed on the display field 69. With this arrangement, the effect of adjustment on the image can be comparatively checked.

An HSV adjustment GUI 71 used for color adjustment in the HSV space and a shift degree adjustment GUI 73 for adjustment of degree of color shift are displayed. In addition, a lightness adjustment GUI 75 is also displayed. The adjustment of lightness refers to adjustment of the lightness of the entire image including a grayscale image.

Figure 19:
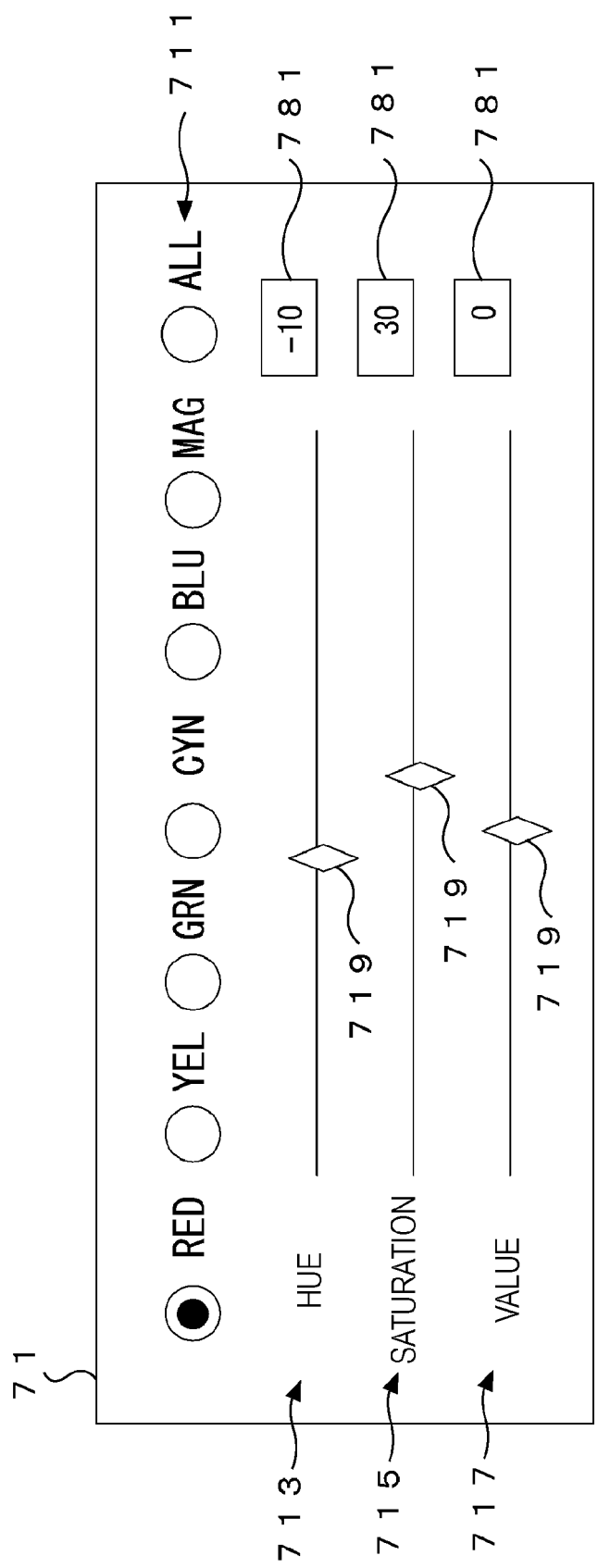
FIG. 19 illustrates a detail of a GUI used for HSV adjustment.
Figure 20:
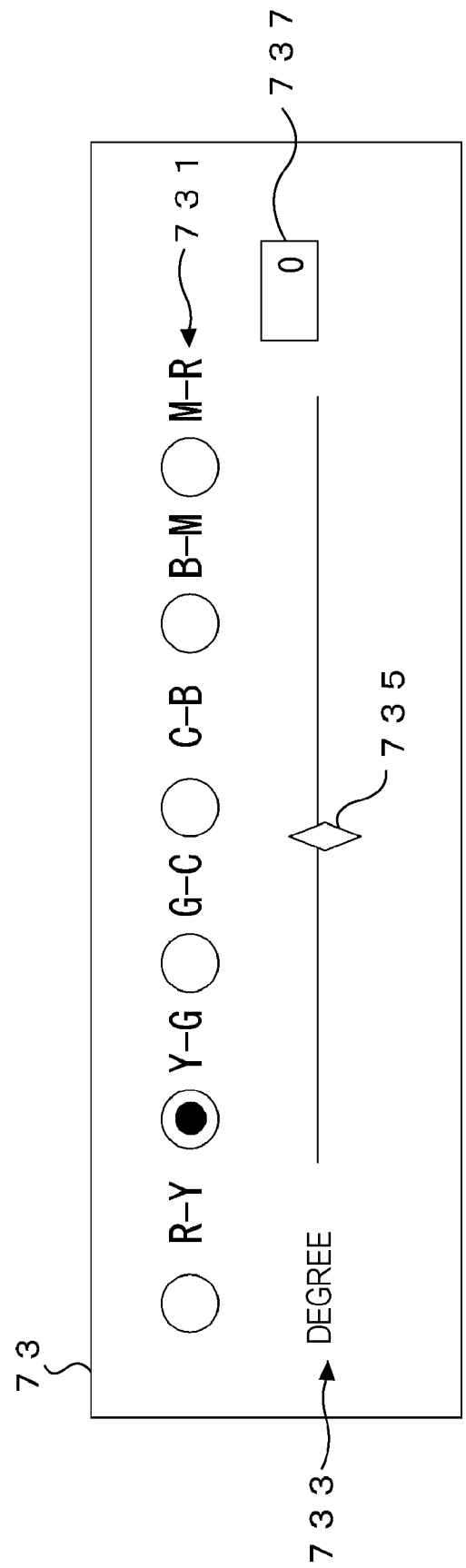
FIG. 20 illustrates a detail of a GUI used for adjustment of a degree of color shift.

In this embodiment, detailed contents of the GUIs 71 and 73 are described using FIG. 19 and FIG. 20. FIG. 19 illustrates detailed contents of the HSV adjustment GUI 71, and FIG. 20 illustrates detailed contents of the shift degree GUI 73.

The HSV adjustment GUI 71 includes a hue selection field 711, a hue adjustment bar 713, a saturation adjustment bar 715, a value adjustment bar 717, slider buttons 719, and adjustment amount indicators 781, The hue selection 711 is used for all of the adjustment of hue, saturation, and value, and allows selection of a hue component among R, G, B, C, M, and Y. It is also possible to select all of the hue components.

This arrangement allows a user to select a hue individually by moving each of the slider buttons 719 of the adjustment bar using a pointing device or the like, so as to specifying desired color adjustment.

The user is also allowed to check an amount of adjustment as a value shown in the adjustment amount indicators 781. The user also can check the element of the adjustment through a change in the contents displayed on the display fields 63, 65, and 69.

The amount of adjustment (parameters) input through the HSV adjustment GUI 71 is used in processing performed in the color adjustment unit and in selecting processing of the lookup table.

The shift degree adjustment GUI 73 includes a hue selection field 731, a shift degree adjustment bar 733, an adjustment slider button 735, and an adjustment amount indicator 737.

This GUI has the same as the HSV adjustment GUI 71 in basic configuration, allowing a user to select a hue component using the hue selection field 731 and then operate the slider button 735.

Note that the degree of color change is adjusted for a specific hue range, selecting all of the hues is not allowed in the hue selection field 731.

The elements of adjustment input through these adjustment GUIs are stored in a storage area (not shown). In this example, ten adjustment elements are to be stored.

Figure 21:
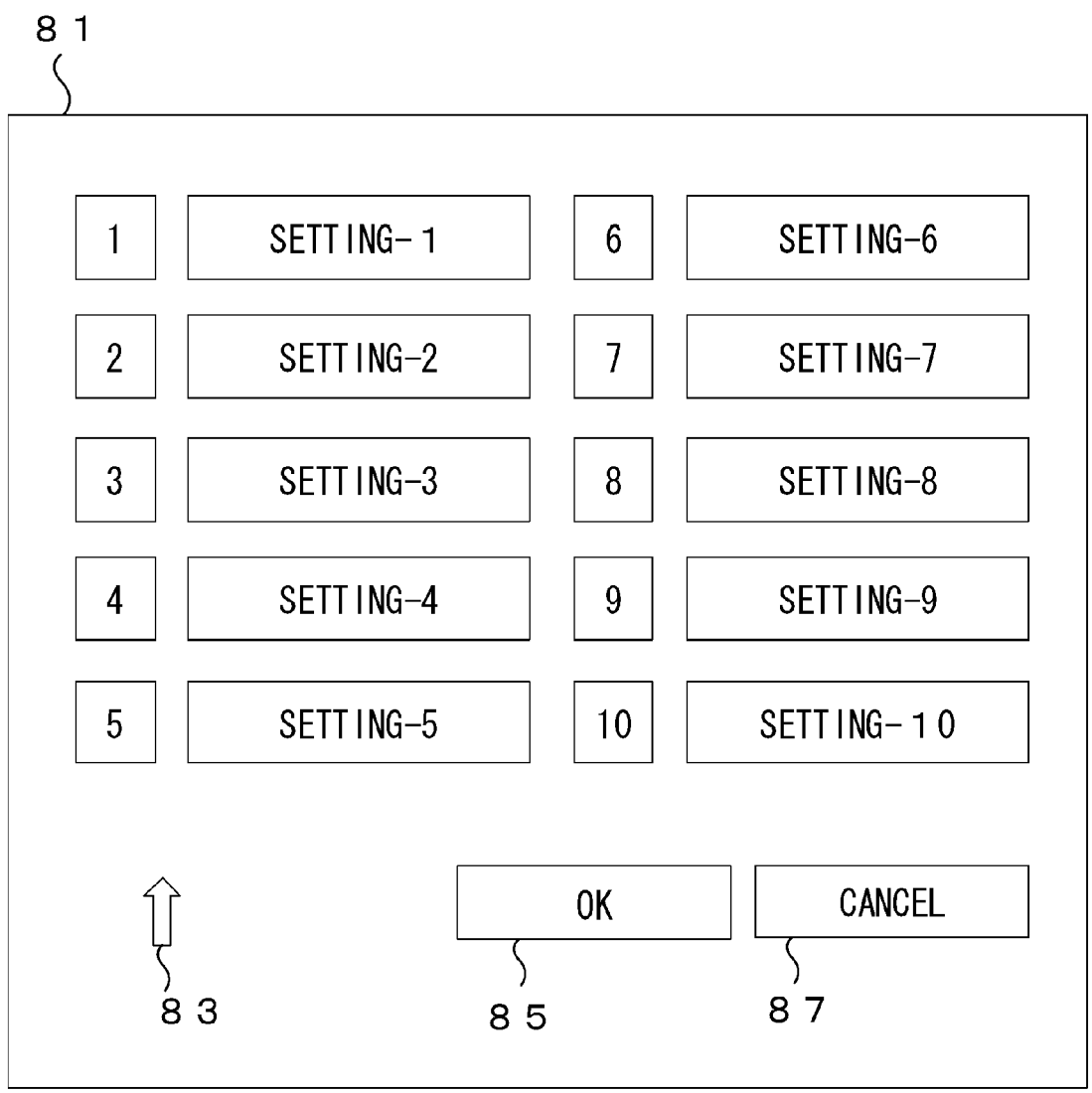
FIG. 21 illustrates an example of screen for displaying ten elements of adjustment.

FIG. 21 illustrates a GUI 81 used for checking adjustment elements, which serves to allow a user to check these ten adjustment elements.

Each of the elements of adjustment indicated in this GUI 81 can be specified using a pointer 83 so as to be read or deleted.

To execute reading of an adjustment element, the user designates the element using the pointer 83 and then selects an "OK" button 85.

To execute deletion of an adjustment element, the user designates the element using the pointer 83 and then selects a "CANCEL" button 87.

D-2. Example of Adjustment Screen 2

The adjustment screen 61 described above permits detailed adjustment of hue, saturation, value and degree of color shift, for all of the hue axes.

However, adjusting the four parameters (i.e., hue, saturation, value and degree of color shift) for six hue axes means managing twenty-four adjusting parameters. Thus, it is generally difficult for a user to handle all of the twenty-four parameters.

Thus, a simpler and more intuitive scheme for determining an amount of adjustment may be necessary.

Figure 22:
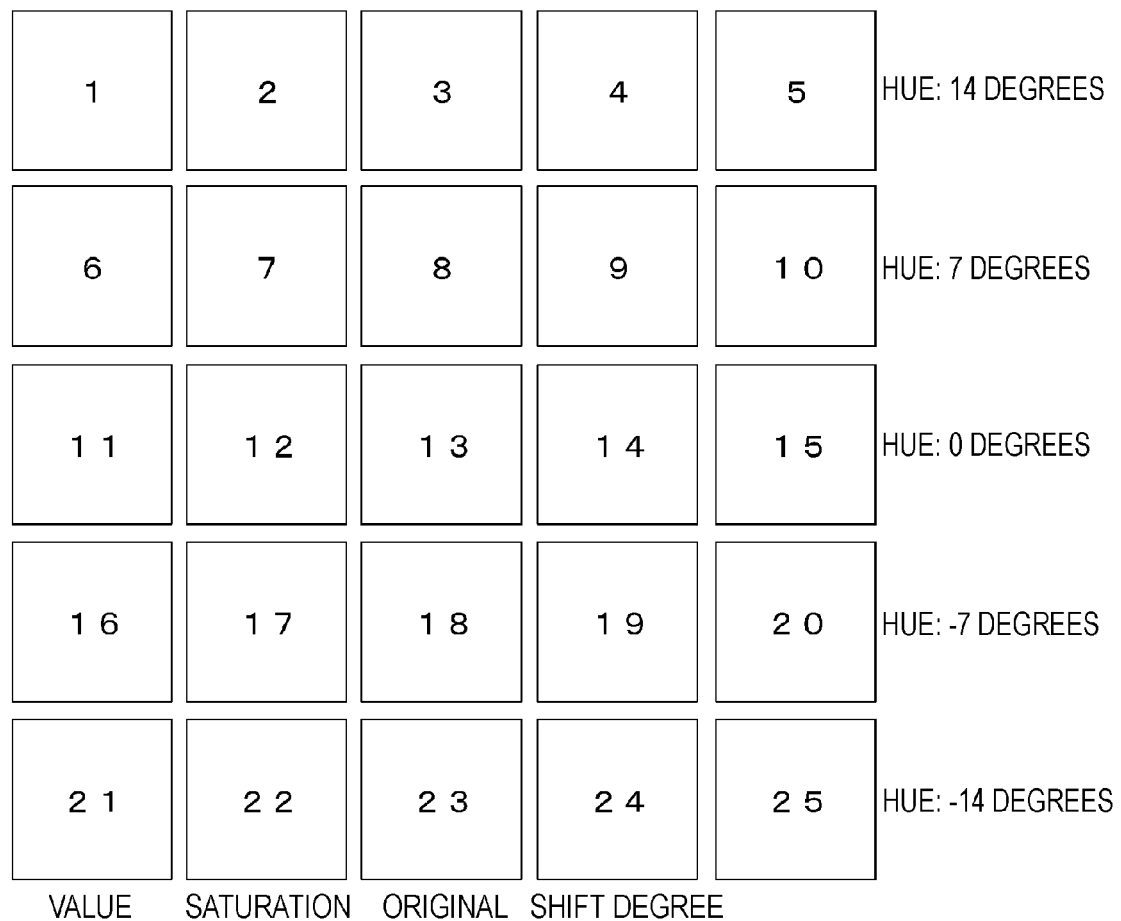
FIG. 22 illustrates an example of another GUI for color adjustment.

Referring to FIG. 22, an example of an adjustment screen for realizing such a simple determination scheme is illustrated. This adjustment screen is composed of twenty-four types of reduced color-adjusted images and one reduced original image. Combinations of adjustment conditions which are generally preferred are applied in these twenty-five reduced images.

With this arrangement, a user is allowed to complete color adjustment by selecting the most desirable image among the twenty-five reduced images or selecting one of serial numbers corresponding to the most desirable image.

In the case of images illustrated in FIG. 22, the number "11" of the serial number corresponds to the reduced image in which only the value has been adjusted. The number "12" corresponds to the reduced image in which only the saturation has been adjusted. The number "13" corresponds to the original image. The number "14" corresponds to the reduced image in which only the degree of color shift has been adjusted.

In FIG. 22, the rightmost column indicates the reduced images in which only the hue has been adjusted. The number "5" corresponds to the reduced image in which the hue has been rotated by 14 degrees in the positive direction. The number "10" corresponds to the reduced image in which the hue has been rotated by 7 degrees in the positive direction. The number "15" corresponds to the reduced image in which the hue has not been adjusted similarly to the image of the number "13". The number "20" corresponds to the reduced image in which the hue has been rotated by 7 degrees in the negative direction. The number "25" corresponds to the reduced image in which the hue has been rotated by 14 degrees in the negative direction.

The other numbers correspond to images in each of which the value, saturation, and/or degree of color shift has been adjusted in conjunction with the hue.

Figure 23:
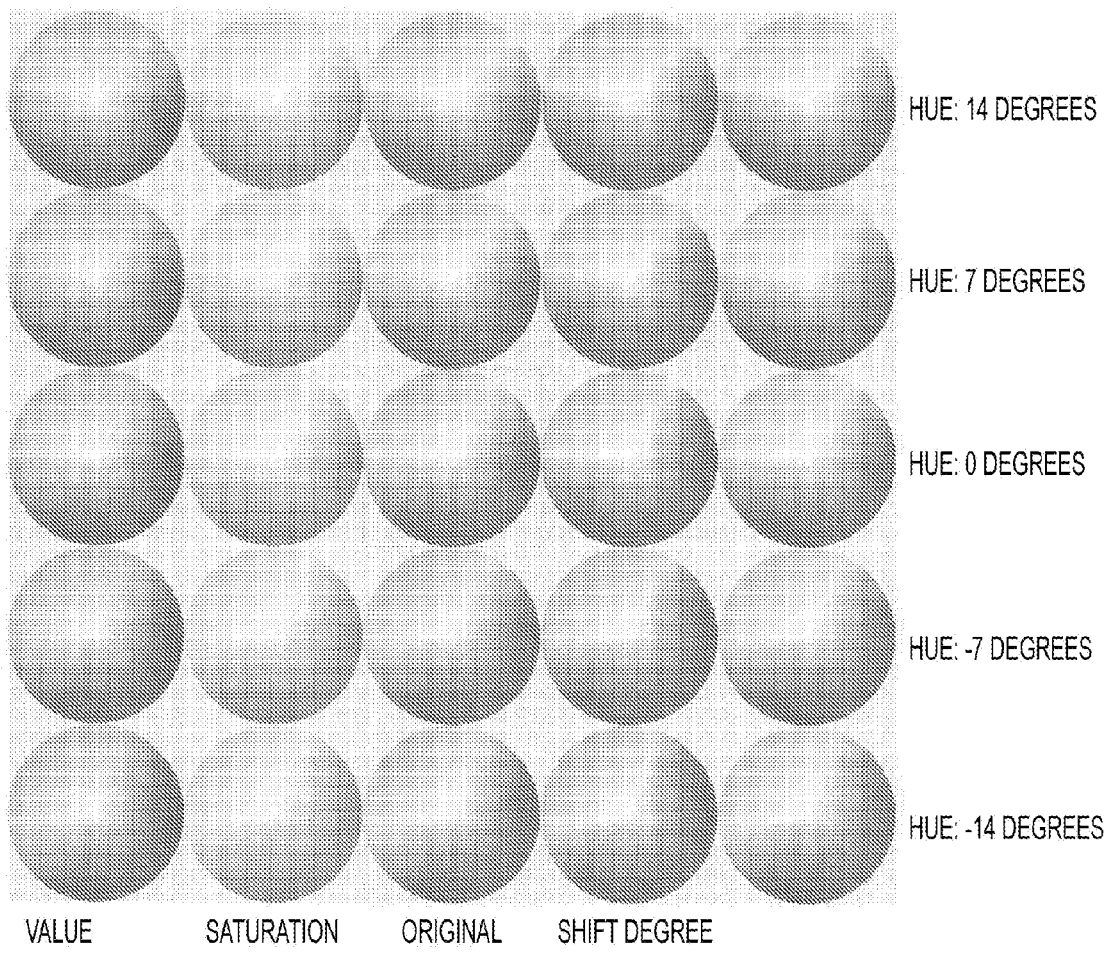
FIG. 23 illustrates a detail of a GUI used for color adjustment.

FIG. 23 illustrates the adjustment screen described above in more detail. The figure shows hue circles in grayscale. However, in the adjustment technique of the present embodiment, these hue circles are to be displayed in color. The images to be displayed in the adjustment screen are not limited to such hue circles, and actual images to be reproduced or reference images may be displayed.

Each of the reduced images is associated with a combination of adjustment values (parameter sets).

Thus, if the user simply selects any of the reduced images, parameters which allow output of image with colors similar to those displayed in the selected reduced image can be determined. The determined parameters are read from the parameter table and applied to the color adjustment processing or set in the lookup table.

This technique, in which one of a plurality of color samples is selected, permits user to readily perform color adjustment which reflect user's preference regardless of user's skill in color adjustment.

E) Effect of Color Adjustment

Using the adjustment techniques described in the above embodiments, color adjustment without affecting the gray balance can be realized.

Even when an input image is provided as RGB data, color adjustment can be executed more readily compared with the known techniques, since an amount of adjustment can be specified in the HSV space, which is more perceptive to human eyes.

Unlike the known techniques, the techniques according to the above embodiment allow independently adjusting only a specific color (hue range) with respect to the hue, saturation, and/or value. Thus, color adjustment can be performed only on a region in an image which needs to be adjusted.

In addition, since the degree of color shift from a hue axis to an adjacent hue axis can be independently adjusted, a degree of freedom in color adjustment can be achieved as compared with the known techniques.

F) Other Embodiment a) In the above embodiment, the case is described where a color adjustment technique is implemented in a display apparatus and a printing apparatus.

However, this adjustment technique can be applied in an image processing apparatus for providing image data to the display apparatus or the printing apparatus. Such an image processing apparatus includes a computer, a video camera, a digital camera, a game device, a scanner, a mobile information terminal such as a portable computer, a mobile phone device, a portable game device, and an electronic book, a timepiece, an image reproducing apparatus such as an optical disc apparatus and home server, a monitor, a television receiver, a processing board or a processing card having installed therein functions according to the embodiments of the present invention, etc.

b) In the above embodiments, the case is described where the color adjustment technique is implemented as software which has been installed in the printing apparatus or the display apparatus. However, a program which executes corresponding functions can be distributed via a network or by being stored in a storage medium such as a magnetic storage medium, an optical storage medium, a semi-conductor, and storage medium.

In addition, processing functions similar to those employed in the adjustment processing in the above embodiments can be implemented as a hardware device which is mounted to the display apparatus or printing apparatus. For example, such a hardware device can be implemented as a card-type communication device, a circuit component of a special-purpose integrated circuit, or an assembly circuit board.

c) In the above embodiments, the case is described where a lookup table which serves as a function of color adjustment performed in the HSV space is installed in the display apparatus. However, the color adjustment function can also be implemented through arithmetic processing in the display apparatus.

d) Various modifications may be applied to the above embodiments within the scope of the spirit of the present invention. In addition, various modification and variations may be made or combined on the basis of the description provided in this specification.

What is claimed is:

1. A color adjusting apparatus, comprising:
a first storage unit for storing information indicating a hue (color phase) range arbitrarily designated in a hue space;
a second storage unit for storing an adjustment value for adjusting a degree of color shift in the hue range;
a third storage unit for storing information indicating a hue range arbitrarily designated in a hue space;
a fourth storage unit for storing an adjustment value for lightness in the hue range;
a color conversion unit for performing expansion processing or compression processing on a color component of input image data, the color component being associated with the hue range, in accordance with the degree of color shift determined by the adjustment value; and
a lightness adjusting unit for increasing or decreasing a lightness component of a chromatic color in the input image data, the lightness component being associated with the hue range, in accordance with the adjustment value, and not increasing or decreasing a lightness component of an achromatic color in the input image data.

2. The color adjusting apparatus of claim 1,
wherein the color conversion of the color conversion unit is executed through calculation processing of a data operation unit.

3. The color adjusting apparatus of claim 1,
wherein the color conversion of the color conversion unit is executed using a lookup table in which an input hue value is associated with an output hue value.

4. The color adjusting apparatus of claim 1,
wherein the input image data on which the color conversion unit performs the color conversion has undergone color space conversion so that the input image data is in a color space defined by hue, saturation, and lightness.

5. The color adjusting apparatus of claim 1,
wherein the hue range is provided as one of a plurality of partitioned hue spaces.

6. A color adjusting apparatus, comprising:
a first storage unit for storing information indicating a hue (color phase) range arbitrarily designated in a hue space;
a second storage unit for storing an adjustment value for adjusting a degree of color shift in the hue range;
a third storage unit for storing information indicating a hue range arbitrarily designated in a color space;
a fourth storage unit for storing an adjustment value for saturation in the hue range;
a color conversion unit for performing expansion processing or compression processing on a color component of input image data, the color component being associated with the hue range, in accordance with the degree of color shift determined by the adjustment value; and
a saturation adjusting unit for increasing or decreasing a saturation component in the input image data, the saturation component being associated with the hue range, in accordance with the adjustment value.

7. A color adjusting apparatus, comprising:
a first storage unit for storing information indicating a hue (color phase) range arbitrarily designated in a hue space;
a second storage unit for storing an adjustment value for adjusting a degree of color shift in the hue range;
a third storage unit for storing information indicating a hue arbitrarily designated in a color space;
a fourth storage unit for storing an amount of hue rotation with respect to the hue;
a color conversion unit for performing expansion processing or compression processing on a color component of input image data, the color component being associated with the hue range, in accordance with the degree of color shift determined by the adjustment value; and
a hue adjusting unit for rotating a color component in the input image data, the color component being in a hue range to be affected by the hue rotation with respect to the hue, in accordance with the amount of hue rotation.

* * * * *